United States Patent
Tan

(10) Patent No.: US 9,990,111 B2
(45) Date of Patent: Jun. 5, 2018

(54) SYSTEMS AND METHODS FOR MANAGING, SELECTING, AND UPDATING VISUAL INTERFACE CONTENT USING DISPLAY-ENABLED KEYBOARDS, KEYPADS, AND/OR OTHER USER INPUT DEVICES

(75) Inventor: Min-Liang Tan, Singapore (SG)

(73) Assignee: RAZER (ASIA-PACIFIC) PTE LTD., Singapore (SG)

( * ) Notice: Subject to any disclaimer, the term of this patent is extended or adjusted under 35 U.S.C. 154(b) by 1041 days.

(21) Appl. No.: 13/978,189

(22) PCT Filed: Jan. 5, 2011

(86) PCT No.: PCT/SG2011/000004
§ 371 (c)(1),
(2), (4) Date: Dec. 26, 2013

(87) PCT Pub. No.: WO2012/093964
PCT Pub. Date: Jul. 12, 2012

(65) Prior Publication Data
US 2014/0143676 A1    May 22, 2014

(51) Int. Cl.
*G06F 3/0484*    (2013.01)
*G06F 3/14*    (2006.01)
(Continued)

(52) U.S. Cl.
CPC ............ *G06F 3/0484* (2013.01); *A63F 13/25* (2014.09); *A63F 13/26* (2014.09);
(Continued)

(58) Field of Classification Search
None
See application file for complete search history.

(56) References Cited

U.S. PATENT DOCUMENTS 5,543,818 A * 8/1996 Scott .................... G06F 3/0236
345/160
5,594,640 A * 1/1997 Capps .................. G06F 17/273
715/235

(Continued)

FOREIGN PATENT DOCUMENTS

CN       101598997 A       9/2009
CN       101853120 A       6/2010
(Continued)

OTHER PUBLICATIONS

Third Office Action dated Apr. 7, 2015 in Chinese patent application No. 201180068018.X.
(Continued)

*Primary Examiner* — Kevin L Young
*Assistant Examiner* — F J Farhadian
(74) *Attorney, Agent, or Firm* — Polsinelli PC

(57) ABSTRACT

A system for managing visual interface content encompassing primary visual interface content and adjunct visual interface content includes a processing unit, a primary display apparatus, a memory, and a set of display-enabled user input apparatuses. The system can be configured to direct or perform visual interface content management operations including selectively establishing associations or mappings between particular adjunct visual interface content and portions of a display-enabled user input apparatus and possibly portions of the primary display apparatus in response to user input; displaying primary visual interface content using the primary display apparatus; displaying adjunct visual interface content using a display-enabled input apparatus, where the first adjunct visual interface content includes visual information that corresponds to a portion of a visual environment absent from the primary display apparatus and which indicates an in-application event; and progressively displaying updated adjunct visual
(Continued)

interface content on an automatic basis and/or in response to user input during application program execution using a display-enabled user input apparatus.

23 Claims, 15 Drawing Sheets

(51) Int. Cl.
  *G06F 9/44* (2018.01)
  *A63F 13/25* (2014.01)
  *A63F 13/26* (2014.01)
  *A63F 13/23* (2014.01)

(52) U.S. Cl.
  CPC ........ *G06F 3/04842* (2013.01); *G06F 3/1423* (2013.01); *G06F 9/4443* (2013.01); *A63F 13/23* (2014.09); *A63F 2300/301* (2013.01); *A63F 2300/308* (2013.01)

(56) References Cited

U.S. PATENT DOCUMENTS

| | | | | |
|---|---|---|---|---|
| 6,016,142 | A * | 1/2000 | Chang | G06F 3/0236 345/168 |
| 6,765,557 | B1 * | 7/2004 | Segal | G06F 3/0488 345/173 |
| 7,396,281 | B2 * | 7/2008 | Mendelsohn | G06Q 30/02 463/42 |
| 7,705,829 | B1 * | 4/2010 | Plotnikov | G06F 3/0236 341/22 |
| 8,547,401 | B2 * | 10/2013 | Mallinson | A63F 13/02 345/632 |
| 9,140,572 | B2 * | 9/2015 | Millington | G06F 3/0236 |
| 9,207,777 | B2 * | 12/2015 | Bos | G06F 3/0237 |
| 9,389,751 | B2 * | 7/2016 | Ohta | G06F 3/0346 |
| 9,474,968 | B2 * | 10/2016 | Zalewski | A63F 13/02 |
| 2001/0029203 | A1 * | 10/2001 | Shoji | A63F 13/04 463/33 |
| 2002/0054120 | A1 * | 5/2002 | Kawano | G06F 3/023 715/773 |
| 2003/0177187 | A1 * | 9/2003 | Levine | A63F 13/10 709/205 |
| 2004/0174400 | A1 * | 9/2004 | Herigstad | G06F 3/0236 715/864 |
| 2005/0043095 | A1 * | 2/2005 | Larson | A63F 13/02 463/42 |
| 2005/0073446 | A1 * | 4/2005 | Lazaridis | G06F 3/0202 341/22 |
| 2006/0205455 | A1 * | 9/2006 | Rehkemper | A63F 13/00 463/1 |
| 2006/0205517 | A1 | 9/2006 | Malabuyo et al. | |
| 2006/0219542 | A1 * | 10/2006 | Savir | G06F 3/0202 200/314 |
| 2009/0063850 | A1 * | 3/2009 | Joram | G06F 21/40 713/155 |
| 2009/0106827 | A1 * | 4/2009 | Cerruti | G06F 21/31 726/7 |
| 2009/0325712 | A1 * | 12/2009 | Rance | A63F 13/12 463/42 |
| 2010/0259491 | A1 * | 10/2010 | Rajamani | H04M 1/72527 345/173 |
| 2010/0279769 | A1 * | 11/2010 | Kidakarn | A63F 13/26 463/31 |
| 2010/0304787 | A1 * | 12/2010 | Lee | G06F 17/30247 455/556.1 |
| 2010/0331082 | A1 * | 12/2010 | Kim | H04M 1/72544 463/30 |
| 2011/0078613 | A1 * | 3/2011 | Bangalore | G06F 3/0237 715/773 |
| 2011/0214053 | A1 * | 9/2011 | Scott | G06F 3/021 715/259 |
| 2012/0192078 | A1 * | 7/2012 | Bai | G06F 3/04883 715/740 |
| 2013/0019191 | A1 * | 1/2013 | Arnold | G06F 3/04886 715/765 |
| 2013/0091583 | A1 * | 4/2013 | Karroumi | G06F 3/0236 726/26 |
| 2013/0113738 | A1 * | 5/2013 | Lee | G06F 3/0488 345/173 |
| 2013/0300664 | A1 * | 11/2013 | Winer | G06F 17/276 345/168 |
| 2014/0281995 | A1 * | 9/2014 | Kim | G06F 3/167 715/719 |

FOREIGN PATENT DOCUMENTS

| | | |
|---|---|---|
| CN | 101644985 A | 10/2010 |
| EP | 1147794 A2 | 10/2001 |
| KR | 1020070106510 A | 1/2007 |
| KR | 1020100117928 A | 4/2009 |
| KR | 1020100046192 A | 5/2010 |
| WO | 2006096739 A2 | 9/2006 |

OTHER PUBLICATIONS

The First Office Action dated Mar. 16, 2015; in Taiwanese patent application No. 101100168.
English translation of the The First Office Action dated Mar. 16, 2015; in Taiwanese patent application No. 101100168.
"Extended European Search Report dated Jan. 5, 2015," European Application No. 11854763.7, 8 pages.
"International Search Report dated Sep. 29, 2011," International Application No. PCT/SG2011/000004, 7 pages.
"First Office Action dated May 20, 2014," Chinese Application No. 201180068018.X, 21 pages.

\* cited by examiner

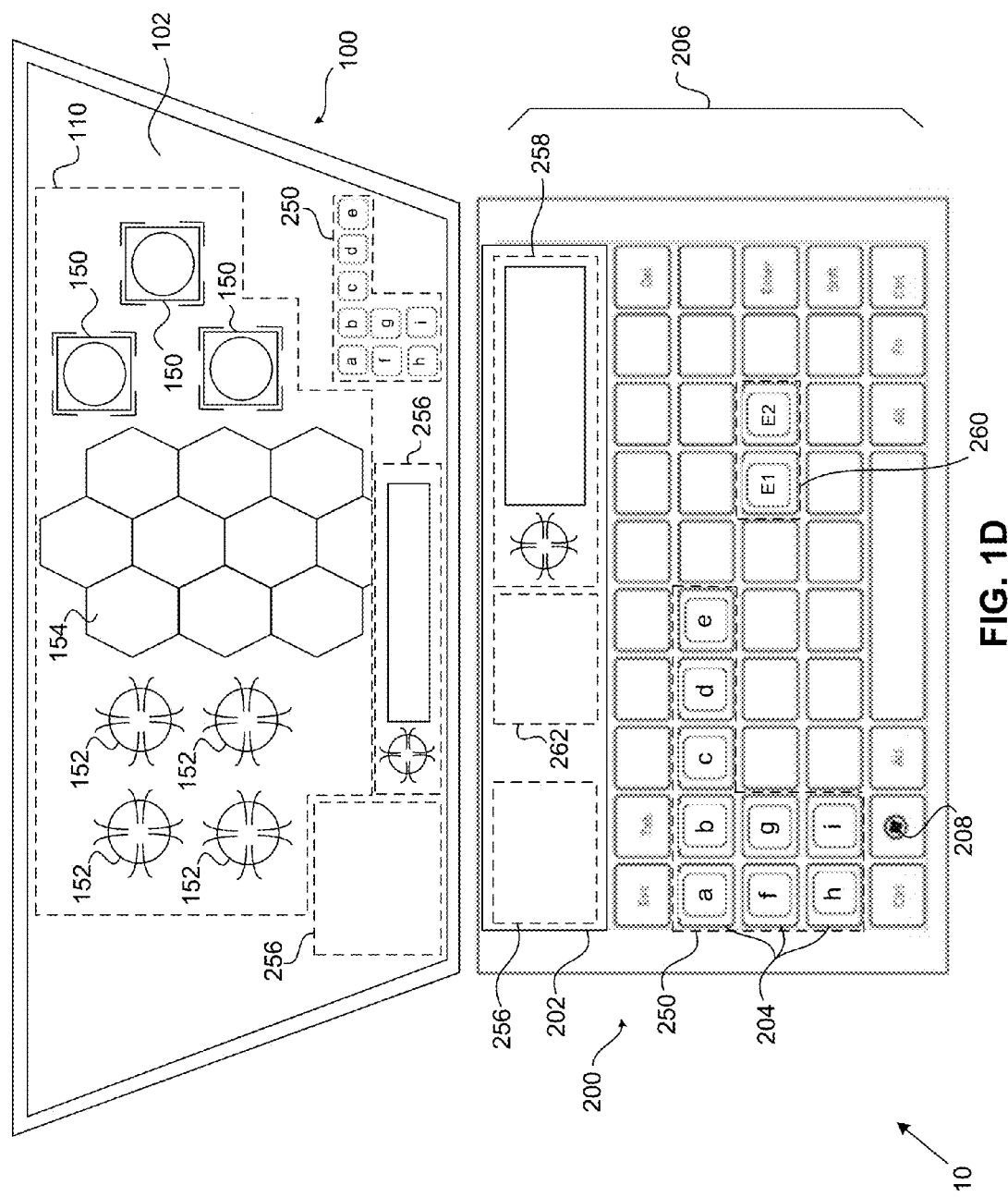

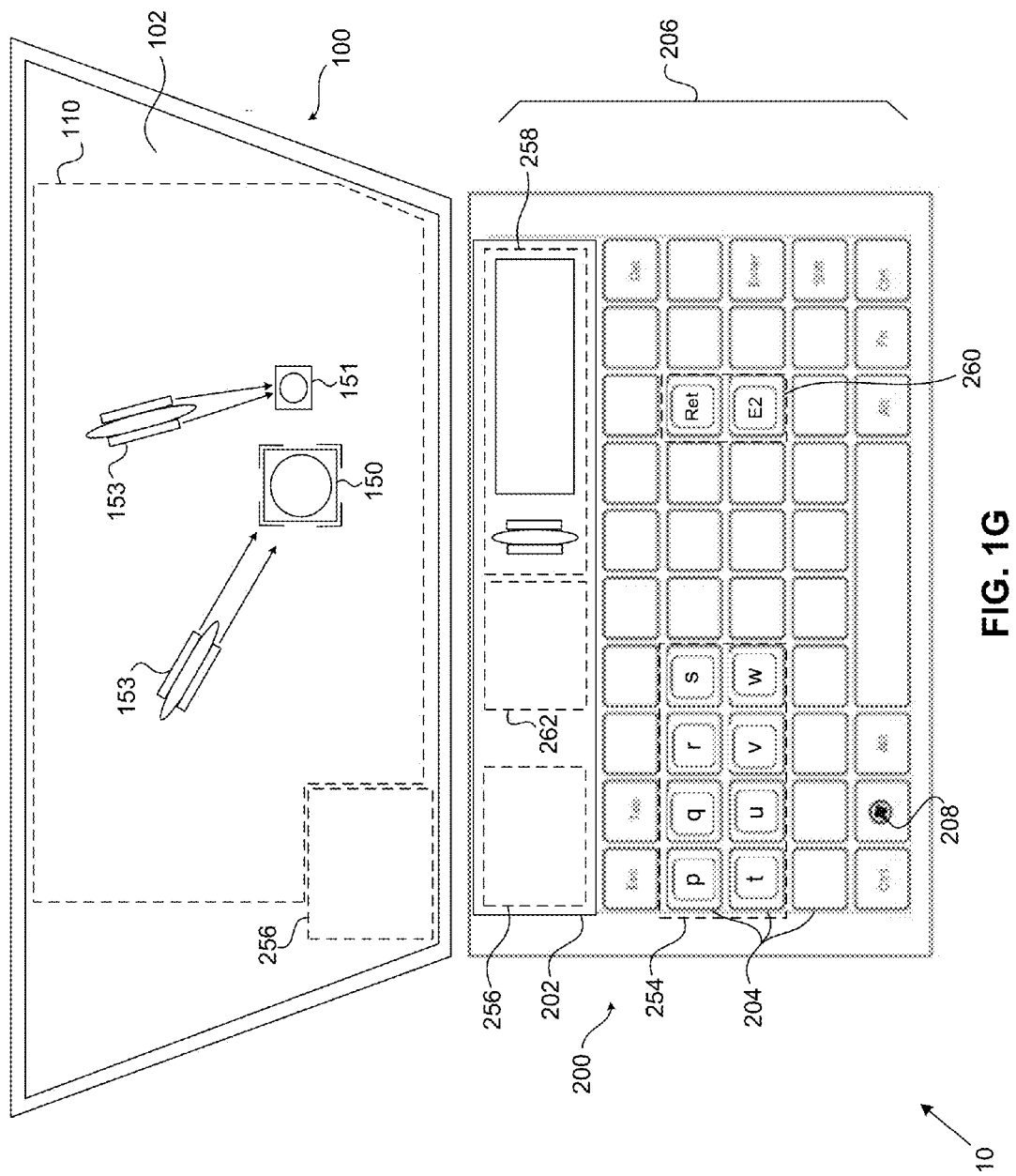

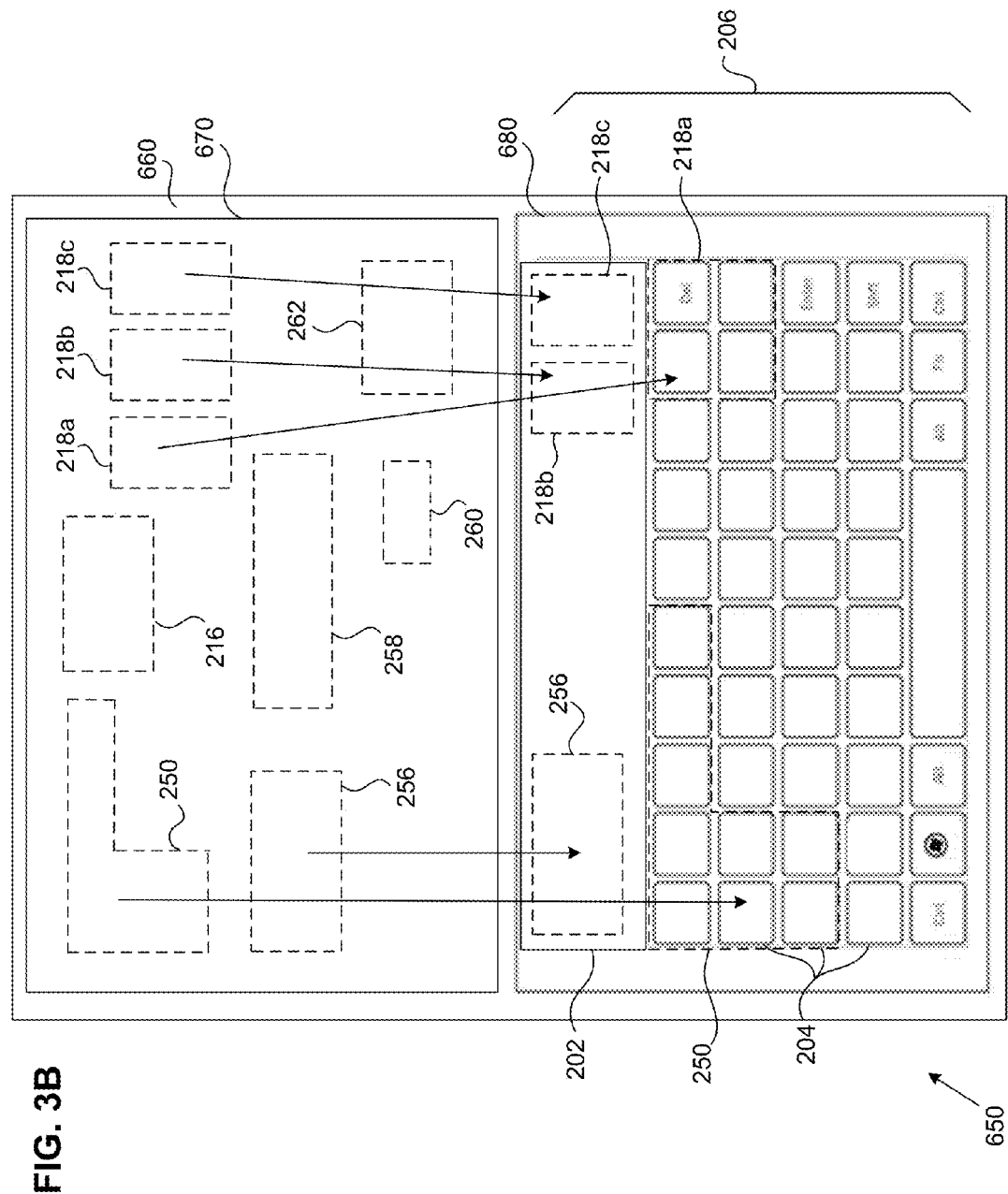

SYSTEMS AND METHODS FOR MANAGING, SELECTING, AND UPDATING VISUAL INTERFACE CONTENT USING DISPLAY-ENABLED KEYBOARDS, KEYPADS, AND/OR OTHER USER INPUT DEVICES

TECHNICAL FIELD

The present disclosure relates to the management and presentation of visual information or optical signals by display-enabled keyboards, keypads, and/or other types of user input devices. More particularly, embodiments of the present disclosure relate to systems and methods for selectively controlling the presentation of visual interface content that includes primary visual interface content and adjunct visual interface content. Primary visual interface content is displayable by a primary display apparatus (e.g., a computer monitor). Adjunct visual interface content is displayable by one or more display-enabled user input devices, and possibly also by the primary display apparatus. A display-enabled user input apparatus such as a display-enabled keyboard, keypad, computer mouse, or game controller is configured to (a) receive user input directed to controlling aspects of application program execution; and (b) selectively present one or more types of adjunct visual interface content associated with a set of application programs in an adaptive manner based upon user input (e.g., directed to the display-enabled user input apparatus), primary visual interface content, and/or application program execution context, status, or state.

BACKGROUND

Electronic games have become increasingly popular in recent decades. Various types of electronic games have demonstrated strong or very strong market growth over time, such as First Person Shooter (FPS) games and Internet-based massively multiplayer online (MMO) games. These types of games as well as other types of types of electronic games are expected to demonstrate continued strong market growth in the foreseeable future.

During the execution of an application program corresponding to a game, a visual interface that provides game-related visual content is presented or displayed to a user, player, or gamer. Depending upon a game application program under consideration, the visual interface can include visual representations of scenes corresponding to a particular game environment in which game play is currently occurring; current interactions between game characters; currently relevant game related information (e.g., character status or attributes, or visual or virtual environment maps); and messages directed to the user. A visual interface can further include visual representations of particular types of game related functions or operations that are currently available for user selection. As the context, status, or state of an electronic game evolves over time in association with user input and game application program execution, visual interface content should adaptively indicate current game context, status, or state at any given moment. That is, visual interface content should be appropriately and dynamically updated such that it visually conveys the current game environment, current interactions between game characters, current game related information, and currently relevant (e.g., strategically or tactically relevant) game related functions or operations that are available for user selection.

As technology has evolved, electronic games and the visual interfaces associated therewith have become increasingly complex. For example, the types of visual environments in which game play can occur; the types of game characters and the manners in such characters can act and/or interact; the types of game related information that can be provided to the user; and the types of user selectable game related functions or operations that can be of situational value have increased and/or become more complex or intricate. Unfortunately, manners in which conventional systems, apparatuses, devices, and techniques for providing visual interface content adapt such content to evolving game context, status, or state are undesirably limited, inefficient, or cumbersome. Additionally, conventional systems, apparatuses, devices, and techniques for tailoring or increasing the number of game related application functions provided for user selection, such as game specific keyboards that provide a customized set of user selectable keys or buttons corresponding to a particular game application program, are inflexible with respect to their ability to adapt to different types and/or or increased numbers of user selectable functions across different game application programs (including different generations of the same game).

In addition to the foregoing, the increasing complexity and graphical details of many games and the sheer amount of visual information that can be generated corresponding to user interaction with an virtual environment has resulted in the display of increasing amounts and/or types of visual interface content during game play, which can result in visual interface content that appears cluttered, confusing, visually distracting, or difficult to interpret or decipher, which can adversely impact the user's visual experience, user input accuracy, and/or user efficiency in interacting with a game application program.

Accordingly, improved systems, apparatuses, devices, methods, and/or techniques are needed for presenting visual interface content to the user and adaptively updating visual interface content in a manner that can enhance a user's visual experience, increase the efficiency of user interaction with a game application program, and/or increase the number and/or types of game application related functions or operations that are available for user selection at one or more times.

SUMMARY

In various embodiments described herein, visual interface content includes primary visual interface content providing a main source of visual information that indicates a current application program execution context, and adjunct visual interface content providing visual information associated with application program execution.

In accordance with an aspect of the disclosure, an automated process for presenting visual interface content comprising primary visual interface content and adjunct visual interface content includes displaying first primary visual interface content using a primary display apparatus during application program execution; displaying first adjunct visual interface content using a set of display-enabled input apparatuses during application program execution, the first adjunct visual interface content including visual information that corresponds to a portion of a visual environment absent from the primary display apparatus and which is indicative of an application event within the execution context of the application program; and progressively displaying updated visual interface content by displaying at least one of updated primary visual interface content (e.g., at least second primary visual interface content) using the primary display apparatus and updated adjunct visual interface content (e.g., at least second adjunct visual interface content) using the set of display-enabled user input apparatuses, the updated primary visual interface content distinct from the first primary visual interface content and the update adjunct visual interface content distinct from the updated adjunct visual interface content.

Displaying the updated adjunct visual interface content can occur (a) automatically as a result of an occurrence of at least one application event within a set of application events during application program execution; and (b) in response to user input directed to interacting with the application program during application program execution.

The process can further include selectively establishing mappings between portions of at least one display-enabled user input apparatus within the set of display-enabled user input apparatuses and at least a subset of at least one of the first adjunct visual interface content and the updated adjunct visual interface content in response to user input. Such user input can at least one of selectively define and selectively modify a display location of at least a subset of at least one of the first adjunct visual interface content and the updated adjunct visual interface content upon at least one display-enabled user input apparatus within the set of display-enabled user input apparatuses. The user input can include one or more graphical object manipulations, such as a set of drag and drop operations directed to a graphical configuration interface that provides a graphical representation of at least one display-enabled input apparatus within the set of display-enabled input apparatuses. A process can additionally include adjusting or modifying the display location(s) or position(s) of particular adjunct visual interface content with respect to or upon one or more display-enabled user input apparatuses in accordance with user input directed to (a) a configuration interface that provides a graphical representation of such display-enabled user input apparatuses; and/or (b) one or more actual display-enabled user input apparatuses themselves.

Based upon or in response to the user input that selectively establishes the aforementioned mappings, a process can also increase or adjust an extent to which a portion of the primary display apparatus is available to display the first primary visual interface content based upon the user input, for instance, by increasing at least one of an amount of visual information and an amount of visual detail conveyed by the first primary visual interface content based upon the user input.

The process can further include displaying at least a subset of the first adjunct visual interface content using the primary display apparatus simultaneous with the display of the first adjunct visual interface content using the set of display-enabled user input apparatuses, where the subset of the first adjunct visual interface content can be selectively determined or defined based upon user input corresponding to corresponding to an amount of adjunct visual interface content to be displayed by the set of display-enabled user input apparatuses. This user input can indicate amount of adjunct visual interface content to be excluded from display by the primary display apparatus, and can further indicate that some or all of the first and/or the updated adjunct visual information content is to be exclusively presented by the set of display-enabled user input apparatuses rather than the primary display apparatus.

In particular embodiments, the first primary visual interface content can provide a portion of a first visual environment, and the first adjunct visual interface content can include at least one of the first remote event notification and first remotely monitored content, where each of the first remote event notification and the first remotely monitored content corresponds to a second visual environment that is excluded from the first visual environment. The first visual environment can correspond to a first virtual geographical area having a first set of virtual geographic boundaries and the second visual environment can correspond to a second virtual geographical area having a second set of virtual geographic boundaries that is outside of the first set of virtual geographic boundaries. In some embodiments, each of the first visual environment and the second visual environment can correspond to an electronic game.

Adaptively displaying updated visual interface content can include displaying at least a portion of the second visual environment as part of the updated primary visual interface content using the primary display apparatus, and interrupting and terminating the display of the first visual environment. Adaptively displaying updated visual interface content can further include displaying second adjunct visual interface content that includes at least one of a second remote event notification that was absent from the first adjunct visual interface content, second remotely monitored content that was absent from the first adjunct visual interface content, and a set of user selectable application program functions that was absent from the first adjunct visual interface content.

In an embodiment, displaying the first adjunct visual interface content and/or the updated adjunct visual interface content using a set of display-enabled input apparatuses comprises displaying a set of visual overlays using the set of display-enabled user input apparatuses rather than the primary display apparatus. The inclusion of particular visual overlays in the first adjunct visual interface content and/or the updated adjunct visual interface content, and the display of such overlays, can be selectively or programmably determined in response to user input.

In accordance with a further aspect of the disclosure, a visual interface content management process can further include displaying a subset of the first adjunct visual interface content using the primary display apparatus; displaying a set of graphical visual content transfer controls corresponding to the subset of the first adjunct visual interface content using the primary display apparatus; and displaying the subset of the first adjunct visual interface content using the set of display-enabled user input apparatuses in response to user selection of a graphical visual content transfer control within the set of graphical visual content transfer controls. The process can also include avoiding the display of the subset of the first adjunct visual interface content by the primary display apparatus following user selection of a graphical visual content transfer control within the set of graphical visual content transfer controls.

In accordance with another aspect of the disclosure, a visual interface content management process can additionally or alternatively include displaying a subset of the first adjunct visual interface content during a first time interval using the set of display-enabled user input apparatuses rather than the primary display apparatus; receiving user input from a display-enabled user input apparatus within the set of display-enabled user input apparatuses; and displaying the subset of the first adjunct visual interface content during a second time interval using the primary display apparatus in response to the user input, which can correspond to at least one of an image, an icon, a symbol, and text displayed by a portion of a display-enabled user input apparatus within the set of display-enabled user input apparatuses. Such a process can further include avoiding or preventing the display of the subset of the first adjunct visual interface content using the set of display-enabled user input apparatuses during the second time interval.

In accordance with an aspect of the disclosure, displaying adjunct visual interface content using a set of set of display-enabled input apparatuses during application program execution can include displaying first adjunct visual interface content using a set of display-enabled buttons carried by one of a display-enabled computer mouse and a display-enabled game controller. Displaying adjunct visual interface content can additionally or alternatively include displaying such content using one or more other types of display-enabled user input apparatuses, such as a display-enabled keyboard.

In accordance with an aspect of the disclosure, one or more computer readable media can store one or more sets of program instructions that when executed cause an automated system having a processing unit, a memory, a primary display apparatus, and a set of display-enabled user input apparatuses to manage, direct, and/or perform particular visual interface content management operations such as operations in accordance with the present disclosure corresponding to or associated with particular processes or process portions described herein.

In accordance with an aspect of the disclosure, a system for presenting visual interface content including or encompassing primary visual interface content and adjunct visual interface content during application program execution includes a processing unit; a primary display apparatus coupled to the processing unit; a set of display-enabled user input apparatuses coupled to the processing unit; and a memory coupled to the processing unit. The memory can include an application program; and a visual interface content manager comprising program instructions that when executed manage, direct, and/or perform visual interface content management operations such as operations in accordance with the present disclosure corresponding to or associated particular processes or process portions described herein.

BRIEF DESCRIPTION OF THE DRAWINGS

Embodiments of the disclosure are described hereinafter with reference to the following drawings, in which:

FIGS. 1A through 1E are schematic illustrations of representative systems for managing, controlling, selecting, presenting, and/or updating primary visual interface content and adjunct visual interface content using a primary display apparatus and at least one display-enabled user input apparatus according to embodiments of the disclosure.

FIG. 1G is a schematic illustration of a representative system corresponding to FIG. 1E, in which primary visual interface content as well as certain adjunct visual interface content has been adapted, updated, or changed in response to user input or the occurrence of an application scenario, situation, condition, or event according to an embodiment of the disclosure.

FIG. 3B is a schematic illustration of a representative visual content configuration interface according to another embodiment of the disclosure.

DETAILED DESCRIPTION

Figure 1A:
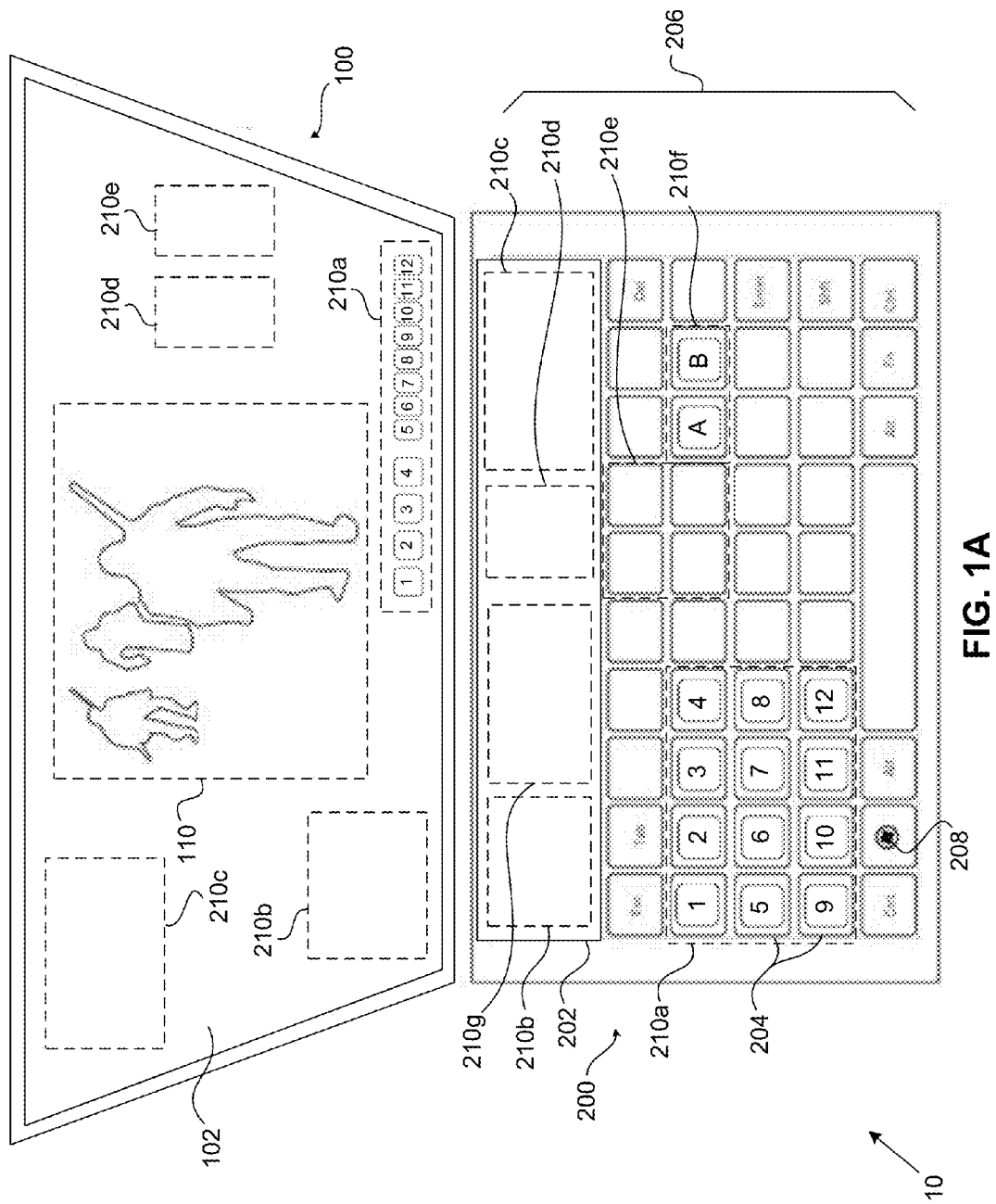

Representative embodiments of the disclosure for addressing one or more of the foregoing problems are described hereafter with reference to FIGS. 1A through 1H, FIGS. 2A and 2B, FIGS. 3A and 3B, FIGS. 4A and 4B, and FIG. 5. For purposes of brevity and clarity, the description herein is primarily directed to user interface systems, apparatus, devices, techniques, and processes for managing, coordinating, mapping, controlling, presenting, and/or selecting visual information corresponding to a primary visual interface and one or more adjunct, auxiliary, or secondary visual interfaces. This, however, does not preclude various embodiments of the disclosure from other applications where fundamental principles prevalent among the various embodiments of the disclosure such as operational, functional, or performance characteristics are required. With respect to the description herein and the corresponding FIGs., like or analogous reference numerals indicate like or analogous elements. Relative to descriptive material corresponding to one or more of FIGS. 1A to 5, the recitation of a given reference numeral can indicate simultaneous consideration of a FIG. in which such reference numeral was previously shown.

In the context of the present disclosure, the term set is defined as a non-empty finite organization of elements that mathematically exhibits a cardinality of at least 1 (i.e., a set as defined herein can correspond to a singlet or single element set, or a multiple element set), in accordance with known mathematical definitions (for instance, in a manner corresponding to that described in *An Introduction to Mathematical Reasoning: Numbers, Sets, and Functions*, "Chapter 11: Properties of Finite Sets" (e.g., as indicated on p. 140), by Peter J. Eccles, Cambridge University Press (1998)).

Representative Aspects of Primary and Adjunct User Interfaces

In general, a user interface can encompass hardware (e.g., user input hardware and visual information output hardware), software (e.g., program instructions corresponding to one or more of firmware, an operating system, and an application program), generated visual information or constructs (e.g., one or more of text, symbols, icons, graphical widgets, visual environments or scenes, animations, video, and portions of user and/or non-player characters), generated effects (e.g., lighting effects or sounds), and/or communicated information (e.g., notifications or messages) that facilitate or effectuate a user's interaction with one or more automated, computerized, or electronic systems or devices, and/or other users of such systems or devices.

In accordance with embodiments of the disclosure, a user interface includes a primary visual interface and one or more adjunct visual interfaces associated with the primary visual interface. An adjunct visual interface can facilitate or enhance a user's interaction with the primary visual interface, an application program, and/or other users. An adjunct visual interface can serve as a support interface for the primary visual interface, and can be associated with or related to particular types of user controllable or user selectable tasks or operations.

In general, the primary visual interface is configured to provide, present, or output primary visual content, information, and/or signals (hereafter primary visual content), and the adjunct visual interface is configured to provide, present, or output adjunct visual content, information, and/or signals (hereafter adjunct visual content). Primary visual content serves as the primary, principal, main, or most direct source of visual information or subject matter by which the current execution status, context, or state of a set of local and/or remote application programs, as well as the results of user interaction with such application programs, are visually indicated, output, or conveyed. Primary visual content is dynamically or progressively updated (e.g., in a real time, near-real time, quasi-real time, synchronous, or generally synchronous manner) in accordance with the current execution status, state, or context of an application program. For instance, an application program execution state can evolve in response to local and/or remote user interaction with (e.g., user input directed to) a set of corresponding local and/or remote application programs, and primary visual content can be updated accordingly based upon such user interaction. Thus, primary visual content can visually indicate or correspond to a current application program execution context and a current state or status of one or more users at any given time.

Adjunct visual content serves as a source of adjunct, associate, or secondary information or subject matter that facilitates or enables the performance of one or more types of functions, operations, or tasks associated with the primary visual interface and/or a local or remote application program. Depending upon embodiment details, adjunct visual content can correspond to (a) application program events (hereafter application events) directly related to, indicated by, or reflective of current primary visual content, including in-application events occurring within the execution context or thematic progression of a currently-executing application program; (b) application events (e.g., in-application events) indirectly related to, unrelated to, or not reflective of current primary visual content (e.g., corresponding to a currently undisplayed portion of a visual or virtual environment or world, which is absent from the primary visual interface content 110); (c) text, animation, video, or graphical content, elements, objects, symbols, emblems, constructs, or entity representations (e.g., game characters) associated with an application program; (d) visual information (e.g., text and/or video) received from other users; (e) a chronology, narrative, or sequence of events associated with an application program; and/or (f) other information.

In general, adjunct visual content can be adaptively updated based upon changes in primary visual content; application program execution state, context, or status; and/or user input. Adjunct visual content can (a) be selectively retrieved, generated, presented, interrupted or recalled while primary visual content is progressively or dynamically updated during application program execution; or (b) remain persistent or generally persistent at one or more times while primary visual content is progressively or dynamically updated. Particular adjunct visual content can be presented or displayed to or hidden from a user depending upon primary visual content and/or a current application program execution state or context.

For purpose of brevity and to aid understanding, particular portions of the description herein are directed to embodiments in which primary visual content and adjunct visual content correspond to or are associated with an electronic entertainment application such as a single-player or multi-player computer or electronic game, which can correspond to essentially any game genre such as one or more of a strategy game, a tactical game, an adventure game, a visual novel, an interactive movie, an action-adventure game, a role playing game (RPG), a navigation game, a combat game, a first person (e.g., first person shooter (FPS)) game, a third person (e.g., third person shooter) game, a vehicular (e.g., racing) game, an educational game, a training game, a simulation (e.g., a life scenario, construction, business, aircraft, spacecraft, or other type of simulation) game, a maze game, a puzzle game, a trivia game, a board game (e.g., checkers, chess, or mahjong), a card game, a gambling game, a music game, a dance game, a sports game, an exercise game, a party game, and/or another type of game.

In some embodiments, primary visual content and adjunct visual content can correspond to or be associated with an MMO game, which can involve dozens, hundreds, or even thousands of users, players, or participants. An MMO game can be, for instance, an MMO Role Playing Game (MMORPG), an MMO Real Time Strategy (MMORTS) game, an MMO First Person Shooter (MMOFPS) game, an MMO Social Game (MMOSG), an MMO Sports Game (MMOSG), or other type of MMO game.

Notwithstanding the foregoing, aspects of the present disclosure can additionally or alternatively involve primary visual content and adjunct visual content that corresponds to or is associated with user-to-user collaboration, communication or messaging (e.g., electronic conferencing, or text, voice, or video messaging or chat); user interaction with a virtual world or virtual community; user education/training; media content development (e.g., audio and/or visual information editing); or other applications, which can be related or unrelated to computer or electronic gaming. Embodiments provided by the present disclosure are not precluded from applications in which particular fundamental structural and/or operational principles described herein are desired.

Aspects of Representative System Embodiments

FIGS. 1A through 1G are schematic illustrations of portions of representative systems 10 for managing, controlling, selecting, presenting, and/or updating primary visual interface content 110 and adjunct visual interface content 210 using a primary display apparatus 100 and at least one display-enabled user input apparatus 200 according to particular embodiments of the disclosure. The primary display apparatus 100 and each display-enabled user input apparatus 200 are coupled to or form a portion of a computer system or computing device such as a desktop or laptop computer or an electronic gaming system, apparatus, or device (e.g., a game console system, or a portable or handheld gaming device) that is configured to execute stored program instructions and/or perform state machine operations that manage, direct, or perform visual interface content management operations, including primary visual interface content management operations and adjunct visual interface content management operations, in accordance with an embodiment of the disclosure.

Primary visual interface content 110 corresponds to primary visual content as described above, and forms portions of a primary visual interface which can include hardware configured to present primary visual interface content 110, software or program instructions configured to generate, update, and/or manage or control the presentation of primary visual interface content 110, and primary visual interface content 110 itself. Representative types of primary visual interface content 110 include images or visual representations of characters associated with one or more local users, one or more remote users, and/or non-player characters; and graphical elements that form portions of a visual or virtual environment or world. Primary visual interface content 110 can be presented or displayed in a main viewing region, surface, area, or window 102 of the primary display apparatus 100.

Adjunct visual interface content 210 corresponds to adjunct visual content as described above, and forms portions of an adjunct visual interface which can include hardware configured to present adjunct visual interface content 210, software or program instructions configured to generate, update, and/or manage or control the presentation of adjunct visual interface content 210, and adjunct visual interface content 210 itself.

Particular representative types of adjunct visual interface content 210 can include, for instance, (a) one or more sets of user selectable images or graphical icons 210*a* (e.g., corresponding to visually selectable application program functions or function sequences); (b) one or more types of visual messages 210*b* (e.g., text or video messages, or scenes within an animated narrative); (c) descriptive or categorical information or data 210*c* corresponding to particular primary visual interface content 110 and/or application program subject matter (e.g., textual, graphical, and/or image data providing explanatory information related to an object within a visual or virtual environment or world); (d) one or more visual overlays or menus 210*d,e* that can be displayed in response to user selection of particular application functions or function sequences; (e) one or more visual condition or event notifications 210*f* corresponding to application situations, conditions, or events that are directly or not directly indicated or conveyed by current primary visual interface content 110 (e.g., notifications of events associated with current primary visual interface content 110, and/or notifications of events within a portion of a visual or virtual environment or world that is outside of or external to a region or visual space defined by current primary visual interface content 110); (f) remotely monitored content 210*g* corresponding to information that is not directly indicated or conveyed by primary visual interface content 110 (e.g., recorded, monitored, surveilled, generated, or retrieved information corresponding to a portion of a visual or virtual environment or world that is outside of or external to a region or visual space defined by current primary visual interface content 110, which is not currently displayed by the primary display apparatus 100); and/or other visual information.

As further described in detail below, in several embodiments adjunct visual interface content 210 can be presented or displayed by one or more display devices or elements carried by portions of a display-enabled user input apparatus 200, such as one or more proximity sensitive, proximity responsive, presence sensitive, presence responsive, pressure sensitive, pressure responsive, force sensitive, force responsive, motion sensitive, motion responsive, orientation sensitive, orientation responsive, position sensitive, position responsive, light sensitive, light responsive, sound sensitive, sound responsive, touch sensitive, touch responsive, object sensitive, and/or object responsive user input elements 202, 204 that are adapted or configured for outputting or transmitting visual signals. In some embodiments, adjunct visual interface content 210 can additionally or alternatively be presented or displayed by one or more display devices or elements that exclude or omit proximity, presence, pressure, force, motion, orientation, position, light, sound, touch, or object sensitive or responsive user input elements 202, 204.

During application program execution, the main purpose or function of the primary display apparatus 100 is to present or display primary visual interface content 110. Depending upon embodiment, configuration, and/or implementation details the primary display apparatus 100 can additionally present or display particular adjunct visual interface content 210 at one or more times (e.g., in a selective, programmable, or configurable manner). The primary display apparatus 100 includes at least one display device, such as a 2D or 3D display device (e.g., a display corresponding to a computer, electronic gaming device, or game console).

In some embodiments, the primary display apparatus 100 includes or carries one or more proximity sensitive, proximity responsive, presence sensitive, presence responsive, pressure sensitive, pressure responsive, force sensitive, force responsive, motion sensitive, motion responsive, orientation sensitive, orientation responsive, position sensitive, position responsive, light sensitive, light responsive, sound sensitive, sound responsive, touch sensitive, touch responsive, object sensitive, and/or object responsive elements, devices, or surfaces configured to detect or receive user input. In such embodiments, the primary display apparatus 100 can be defined as an input-enabled display apparatus. For instance, in certain embodiments, the primary display apparatus 100 can include a touch screen display. In other embodiments, the primary display apparatus 100 omits or excludes proximity, presence, pressure, force, motion, orientation, position, light, sound, or touch sensitive or responsive elements, devices, or surfaces.

A display-enabled user input apparatus 200 is configured to receive user input directed to controlling aspects of application program execution and/or user interaction with the primary visual interface, and is further configured to present or display particular adjunct visual interface content 210 at one or more times (e.g., in a selective, programmable, or configurable manner). The main purpose or function of a display-enabled user input apparatus 200 is to provide a user input/visual output interface that presents or outputs adjunct visual interface content 210 that can be selected by way of user input directed to one or more user input elements carried by the display-enabled user input apparatus 200. In various embodiments, at least some user input elements can be adapted or configured to transmit or output visual signals in a manner that facilitates or enables the presentation or display of adjunct visual interface content 210, as further described in detail below.

A display-enabled user input apparatus 200 includes at least one user input device, such as a keyboard, keypad, computer mouse, trackball, joystick, or game controller that carries and/or is coupled to at least one set of elements or structures configured for detecting or receiving one or more types of user input. Such user input elements or structures can include one or more proximity sensitive, proximity responsive, presence sensitive, presence responsive, pressure sensitive, pressure responsive, force sensitive, force responsive, motion sensitive, motion responsive, orientation sensitive, orientation responsive, position sensitive, position responsive, light sensitive, light responsive, sound sensitive, sound responsive, touch sensitive, touch responsive, object sensitive, and/or object responsive elements or structures. A display-enabled user input apparatus 200 further includes, carries, and/or is coupled to at least one set of optical signal or image presentation, display, or output elements or structures. Such image presentation elements or structures are separate or distinct from the primary display apparatus 100, and are configured for transmitting, outputting, or displaying visual signals corresponding to portions of textual, graphical, or video images. Depending upon (a) embodiment details; (b) implementation details; (c) configuration details; (d) events corresponding to current and/or prior primary visual interface content 110; (e) events corresponding to a region within a visual or virtual environment or world that is outside the scope of, external to, or not directly indicated by a visual or virtual region defined by current primary visual interface content 110; (f) user input; and/or (g) an application program execution context, status, or state, particular optical signal or image presentation elements or structures can display adjunct visual interface content 210 in a static or dynamic manner (e.g., with respect to one or more time intervals, and/or based upon user input events or application program events), as further detailed below.

In several embodiments, a display-enabled user input apparatus 200 includes one or more user selectable input devices, elements, or structures 202, 204 (e.g., a type of proximity, presence, pressure, force, motion, orientation, position, light, sound, touch, or object sensitive or responsive element or structure configured to convert or transduce user action(s), selection(s), or intention(s) to a set of user input signals) that are adapted or configured for transmitting, outputting, or displaying visual signals corresponding to portions of textual, graphical, or video images. For instance, a display-enabled user input apparatus 200 can include a user input device having a set of display-enabled tactile, pressure sensitive, force sensitive, touch sensitive, or touch responsive input elements 202, 204, which in certain embodiments correspond to portions of a display-enabled keyboard or keypad 206. Depending upon embodiment details, display-enabled user input elements 202, 204 can include portions of a touch screen display 202, and/or display-enabled keys or buttons 204 (e.g., a set of display-enabled keyboard or keypad keys or mouse buttons). Such keys or buttons 204 can individually carry (a) display devices such as LCDs or OLEDs; and/or (b) optically transmissive or transparent display windows, which are offset from or disposed above a display surface such as an LCD or OLED display screen in a manner that enables the transmission of visual signals from portions of the display screen through the display window of any given key or button 204. In certain embodiments, at least some of such keys or buttons 204 can be resiliently biased.

In several embodiments, a display-enabled user input apparatus 200 can additionally include one or more pointing devices 208 such as an isometric joystick, pointing stick, or pointing nub; a trackball; or a touchpad or trackpad. In certain embodiments, a touchpad or trackpad corresponding to or carried by a display-enabled user input apparatus 200 can include a display element or visual signal output device. For instance, a touchpad carried by a display-enabled user input apparatus 200 can include an LCD screen or pad that includes optical sensors configured to detect pen or stylus based input as well as finger based input, as manufactured by Sharp Corporation of Osaka, Japan.

In a representative implementation, a display-enabled user input apparatus 200 can correspond to, include, or be based upon one or more types of devices described in U.S. Patent Application entitled "Optically Transmissive Key Assemblies for Display-Capable Keyboards, Keypads, or Other User Input Devices, filed as a Patent Cooperation Treaty (PCT) application on 4 Jan. 2011 PCT/US2011/020214, which is incorporated herein by reference in its entirety. Additionally or alternatively, in a representative implementation, a display-enabled user input apparatus 200 can correspond to, include, or be based upon an Optimus Maximus, Optimus Popularis, Optimus Tactus, Optimus Mini Three, or Optimus Aux keyboard, developed by the Art.Lebedev Studio, Moscow, Russia (www.artiebedev.com).

Aspects of Managing or Presenting Primary and Adjunct Visual Interface Content

Adjunct visual interface content 210 can be selectively or programmably associated with or output, mapped, allocated, or assigned to one or more portions of a display-enabled user input apparatus 200. More specifically, particular adjunct visual interface content 210 can be selectively or programmably associated with or output, mapped, allocated, or assigned to particular display-enabled input elements 202, 204 such as particular portions or regions of a touch screen display 202 and/or particular display-enabled keys or buttons 204. Such selective or programmable mapping of particular adjunct visual interface content 210 to particular portions of a display-enabled user input apparatus 200, and/or the presentation or display of adjunct visual interface content 210 by the display-enabled user input apparatus 200, can occur in an adaptive, dynamic, and/or "on-the-fly" manner that cooperates or is coordinated or complementary with (a) changes in local or remote application program execution context, status, or state; (b) application events that are indicative of or directly related to primary visual interface content 110; (c) application events that are indirectly related to, unrelated to, or not reflective of current primary visual interface content 110; (d) user input corresponding to application functions or function sequences that result in the generation of one or more visual overlays (e.g., display screen overlays) or menus 210*f,g*; (e) other user input; and/or (f) changes in application programs themselves (e.g., a transition, change, or context switch corresponding to the execution of a first application program and a second application program that is distinct from the first application program). In multiple embodiments the selective or programmable mapping of particular types of adjunct visual interface content 210 to particular portions of a display-enabled user input apparatus 200 can occur in accordance with a set of mapping or configuration parameters, as further described below.

Depending upon (a) embodiment, configuration, or implementation details; (b) current primary visual interface content 110; (c) a current application program execution context, status, or state; and/or (d) user input, particular adjunct visual interface content 210 can be simultaneously presented or displayed by portions of both the primary display apparatus 100 and a display-enabled user input apparatus 200. That is, at least a particular portion or a subset of adjunct visual interface content 210 that is presented or displayed by a set of display-enabled user input apparatuses 200 can be simultaneously displayed by the primary display apparatus 100. Additionally or alternatively, particular adjunct visual interface content 210 can be exclusively presented or displayed by portions of a display-enabled user input apparatus 200 at one or more times rather than the primary display apparatus 100, thereby increasing or maximizing an amount of application related visual information that can be efficiently conveyed to the user, increasing or extending a number of user selectable application program functions or operations that can be visually presented to the user, and/or enhancing the effectiveness of user interaction with an application program.

Additionally, the presentation of particular adjunct visual interface content 210 by portions of a display-enabled user input apparatus 200 rather than the primary display apparatus 100 can increase or maximize an extent to which the primary display apparatus 100 can present or output primary visual interface content 110, and/or reduce or minimize visual clutter that unnecessarily or undesirably detracts from, interferes with, or limits the presentation of primary visual interface content 110 to the user. The designation of particular types of adjunct visual interface content 210 as presentable by one or more display-enabled user input apparatuses 200 and/or the primary display apparatus 100 can occur in a predetermined or a selectable or programmable manner, for instance, by way of a configuration interface as further described in detail below.

In some embodiments, in association with or following user selection, specification, assignment, or mapping of particular adjunct visual interface content 210 to portions of one or more display-enabled user input apparatuses 200 rather than the primary display apparatus 100, an application program can automatically adjust or modify a displayable or displayed extent, size, amount, or area of primary visual interface content 110. For instance, based upon an extent to which portions of the primary display apparatus 100 are excluded from presenting particular adjunct visual interface content 110, an application program can expanding a set of visual or virtual boundaries corresponding to the primary visual interface content 110, and/or resize primary visual interface content 110 relative to a region, area, or surface of the primary display apparatus 100. Resizing primary visual interface content 110 can result in the display of an increased amount of primary visual interface content 110, and/or the display of primary visual interface content 110 having an enhanced level of detail or visual granularity.

To aid understanding of various aspects of embodiments according to the present disclosure, FIGS. 1B through 1G illustrate non-limiting representative embodiments of the present disclosure in which primary visual interface content 110 and adjunct visual interface content 210 correspond to a computer or electronic game, for instance, World of Warcraft® or Starcraft® II, each of which is produced by Blizzard Entertainment of Irvine, Calif., USA.

Figure 1B:
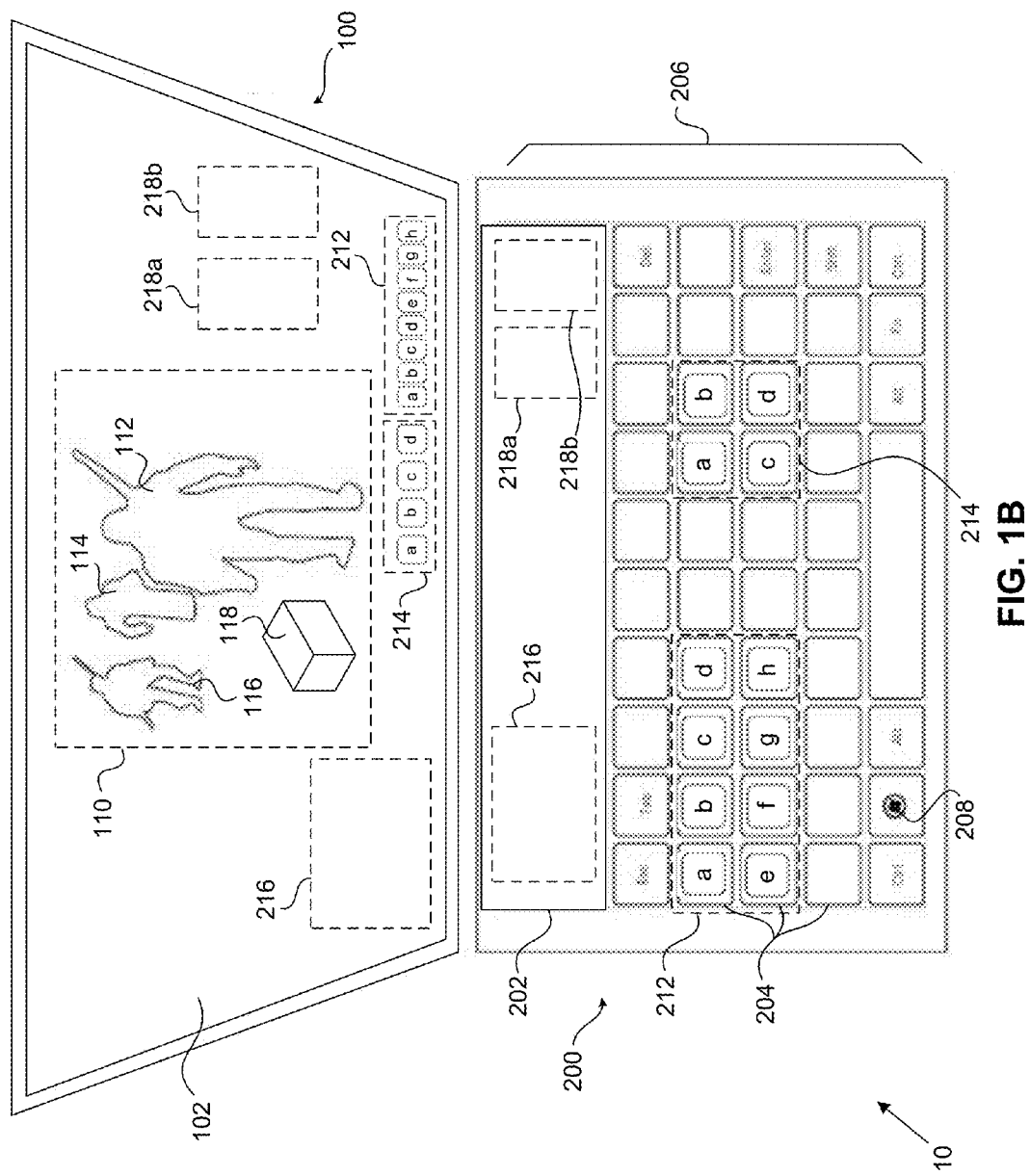
Figure 1C:
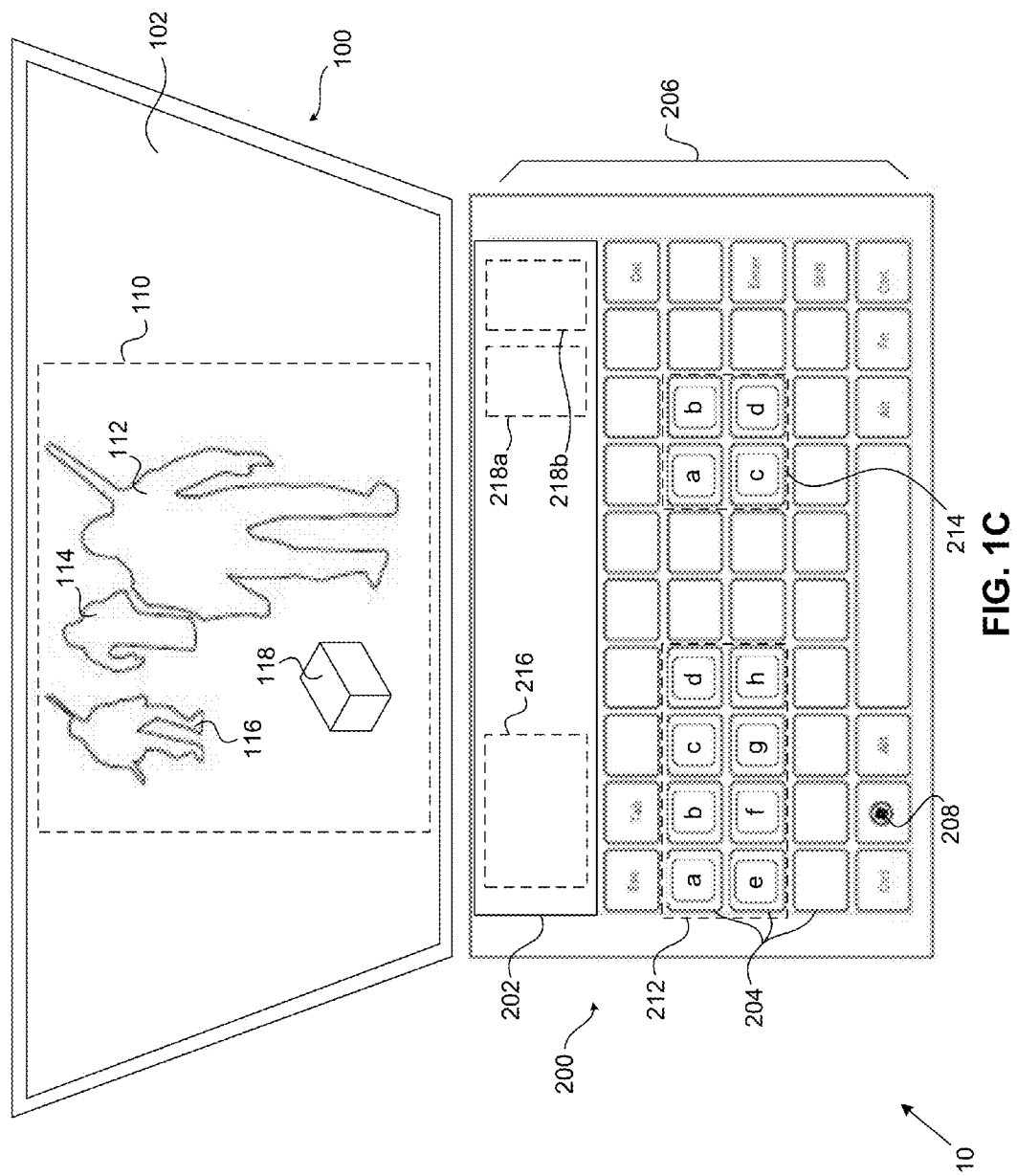

In FIGS. 1B and 1C, representative primary visual interface content 110 can include visual representations of one or more of a game characters 112 corresponding to a system user, player, or gamer (e.g., a character avatar corresponding to a user that is directly operating, interacting with, or providing user input to the system 10), a number of allied characters 114 (e.g., corresponding to other users), a number of enemy characters 116 (e.g., which can correspond to other users or non-player characters), and particular objects or scenery 118 within a portions of a visual or virtual game environment or world presented in a main viewing region or window 102 of the primary display apparatus 100. Additionally, representative adjunct visual interface content 210 can include one or more arrays of graphical action keys 212a-h that can invoke particular game-related actions, functions, or operations in response to user selection; an array of inventory icons 214a-d corresponding to objects or skills that the user's character possesses; messaging or chat content 216; and/or one or more visual overlays or menus 218a,b.

In multiple embodiments in accordance with the present disclosure, each of the primary display apparatus 100 and at least one display-enabled user input apparatus 200 is configured for presenting adjunct visual interface content 210. For instance, in the representative embodiment illustrated in FIG. 1B, each of the primary display apparatus 100 and a display-enabled user input apparatus 200 is configured for presenting or displaying graphical action keys 212a-h, inventory icons 214a-d, messaging or chat content 216, and visual overlays or menus 218a,b. Adjunct visual interface content 210 that is presented by the primary display apparatus 100 can be output in one or more subregions, subwindows, or child windows 104 within a main viewing region, area, or window 102 corresponding to the primary display apparatus 100, in a manner understood by one of ordinary skill in the art. Adjunct visual interface content 210 that is presented by the display-enabled user input apparatus 200 can be associated with or mapped or assigned to particular portions of the display-enabled user input apparatus 200 (e.g., in a predetermined or selectable or programmable manner), such as a touch screen display 202 and/or particular display-enabled keys or buttons 204.

In multiple embodiments in accordance with the present disclosure, user interaction with or selection of one or more types of adjunct visual interface content 210 presented by the display-enabled user input apparatus 200 (e.g., as a result of user selection of one or more display-enabled keys or buttons 204 and/or portions of a touch screen interface 202), either alone or in association or combination with user selection of primary and/or adjunct visual interface content 210, 210 presented by the primary display apparatus 100 (e.g., as a result of user selection of primary display apparatus visual interface content 110, 210 using a pointing device 208) can result in enhanced economy of user motion compared to user manipulation of conventional input devices (e.g., a conventional computer mouse), simplified or more convenient user selection of particular adjunct visual interface content 210 of interest, and/or enhanced efficiency user interaction with a set of local and/or remote application programs.

For instance, a user can rapidly and efficiently select a given graphical action key 212a-h that is presented or displayed by the display-enabled user input apparatus 200 by directly manipulating, pressing, or touching a particular display-enabled key or button 204 that displays the graphical action key 212a-h of interest, rather than manipulating a conventional computer mouse to (a) move a pointer or cursor displayed by the primary display apparatus 100; (b) align the pointer or cursor over the graphical action key 212a-h of interest; and (c) select the graphical action key 212*a-h* of interest using a mouse button. Additionally, user selection of adjunct visual interface content 210 presented by the display-enabled user input apparatus 200 can result in fewer user input errors resulting from imprecise or incorrect user positioning of a pointer or cursor displayed by the primary display apparatus 100, and thus fewer undesirable or unintentional application program events or errors, particularly when rapid or very rapid user interaction with an application program (e.g., a computer game) is desired or required.

In some embodiments in accordance with the present disclosure, one or more display-enabled user input apparatuses 200 are configured to present adjunct visual interface content 210, but the primary display apparatus 100 is configured to exclude, omit, or avoid presenting at least certain types of adjunct visual interface content 210. For instance, in the representative embodiment illustrated in FIG. 1C, the display-enabled user input apparatus 200 is configured to present the adjunct visual interface content 210 shown in FIG. 1B, but the primary display apparatus 100 is configured to exclude, omit, or avoid presenting such adjunct visual interface content 210. As a result, in addition to enhancing user movement efficiency, simplifying user selection of adjunct visual interface content 210, and/or increasing user selection accuracy of adjunct visual interface content 210 as described above, particular embodiments of the present disclosure can increase or maximize an extent to which the primary display apparatus 100 can present primary visual interface content 110, thereby reducing primary visual interface clutter and aiding or enhancing the user's visual experience and/or interaction with an application program.

Adjunct visual interface content 210 can include visual information indicative of a wide variety of application related situations, conditions or events. For instance, adjunct visual interface content 210 can include images, graphics, animations, and/or text that relates or corresponds to (a) application program execution context, status, or state; (b) user selectable application functions or operations; (c) user character information (e.g., an energy level associated with user forces or a user character); (d) user statistics (e.g., an Actions per Minute (APM) count); (e) current primary visual interface content 110; and/or (f) a situation, condition, or event corresponding to a visual or virtual region that is outside the scope, bounds, and/or situational context of currently displayed primary visual interface content 110.

The display of particular types of adjunct visual interface content 210 (e.g., content that is beyond or outside the scope or situational context of visual information that currently indicated by primary visual interface content 110, or content which is not readily apparent from primary visual interface content 110) can enhance or extend the types and/or amount of visual information that can be provided to a user, thereby enhancing or extending the manners in which the user can interact with a set of local and/or remote application programs. Particular types of adjunct visual interface content 210, including representative types of visual notifications and/or remote content that is representative or indicative of events external to primary visual interface content 110, which can enhance or extend the manner(s) in which a user can interact with an application program are described in detail hereafter.

Figure 1E:
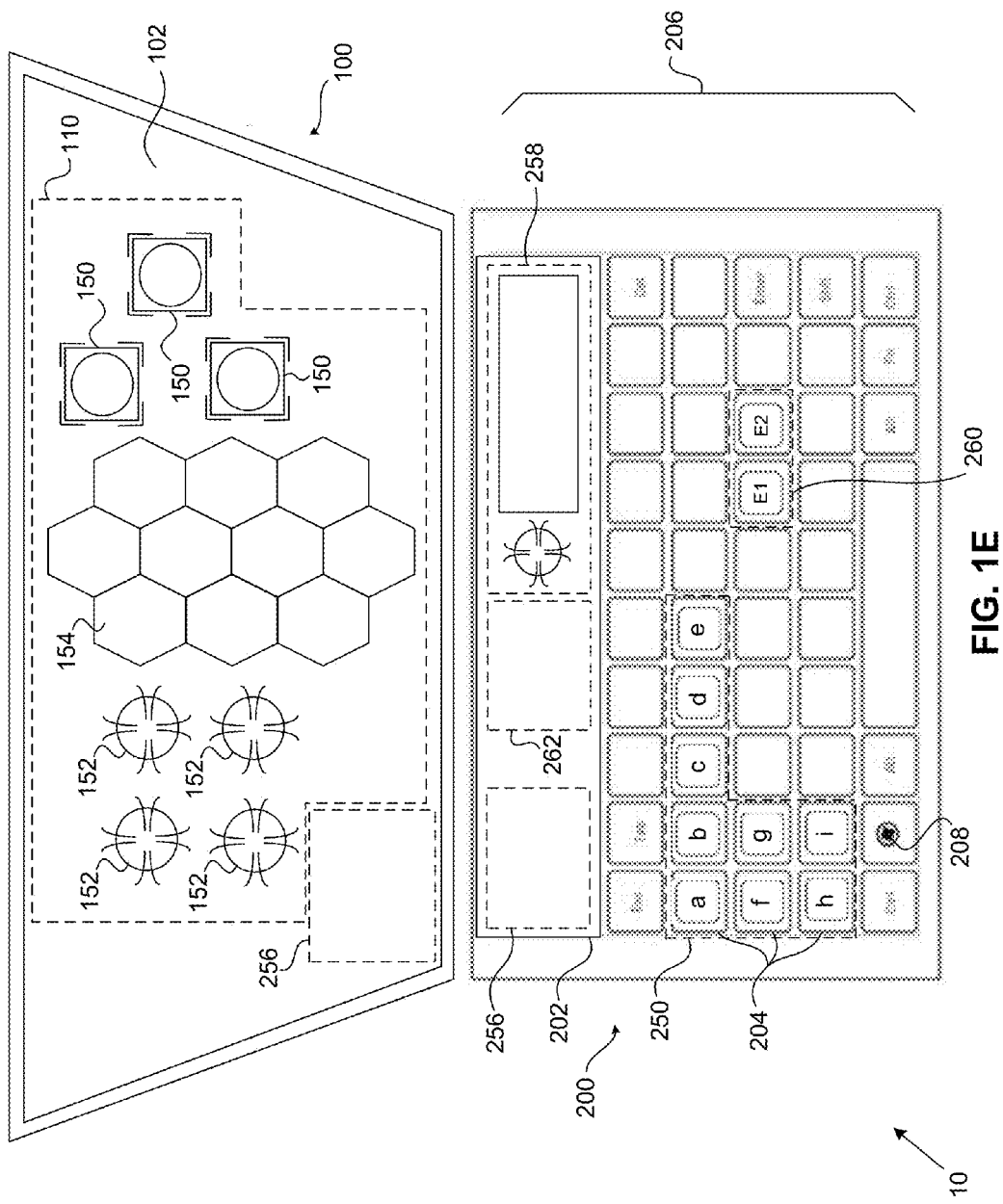

In FIGS. 1D and 1E, representative primary visual interface content 110 can include visual representations of a set of user controllable or user manipulable entities, forces, structures, devices, or resources 150; a set of enemy entities, forces, structures, devices, or resources 152; and/or particular objects or scenery 154 within portions of a virtual game world or environment presented within a main viewing region, area or window 102 of the primary display apparatus 100. Representative adjunct visual interface content 210 can include an array of graphical hotkeys 250*a-i* that can invoke particular game-related actions, functions, or operations in response to user selection; a virtual environment navigation aid, tool, or map 256; and selected object or character information 258.

Representative adjunct visual interface content 210 can further include a set of visual event notifications 260, and/or remotely monitored content 262. Remotely monitored content 262 can correspond to information that is not directly indicated or conveyed by primary visual interface content 110. In some embodiments, remotely monitored content 262 can include recorded, monitored, surveilled, generated, or retrieved information corresponding to a portion of a visual or virtual environment or world that is outside of or external to a region or visual space defined by current primary visual interface content 110, but which is relevant to user interaction with an application program. Visual event notifications 260 can be presented or displayed on a selective or programmable basis in response to the occurrence of an associated application event. Additionally, remotely monitored content 262 can be presented or displayed on a continuous or selective/programmable basis. As further detailed below, a set of configuration parameters (e.g., established by way of user interaction with a configuration interface) can determine manners in which in which visual event notifications 260 and/or remotely monitored content 262 are to be presented or displayed by one or more display-enabled user input apparatuses 200.

In a representative embodiment illustrated in FIG. 1D, each of the primary display apparatus 100 and the display-enabled user input apparatus 200 is configured for presenting adjunct visual interface content 210 including the aforementioned graphical hotkeys 250*a-i*, the navigation aid or map 256, and object or character information 258. Adjunct visual interface content 210 presented by the primary display apparatus 100 can be displayed by one or more subregions, subwindows, or child windows 104 within a main viewing region, area, or window 102 corresponding to the primary display apparatus 100, in a manner understood by one of ordinary skill in the art. Adjunct visual interface content 210 presented by the display-enabled user input apparatus 200 can be associated with or mapped or assigned to particular portions of the display-enabled user input apparatus 200.

As illustrated in FIG. 1D, the display-enabled user input apparatus 200 is also configured for presenting particular visual event notifications 260, which can include an image, icon text, and/or optical signals corresponding to a first event E1 and/or a second event E2. In a representative embodiment, the first event E1 can correspond to an attack on user forces 150 deployed or positioned outside of a visual or virtual region defined by current primary visual interface content 110 and/or the navigation aid or map 256; and the second event E2 can correspond to a current user APM value relative to target or threshold APM value. Visual content or signals corresponding to one or both of the first and second events E1 and E2 can be selectively presented or displayed in accordance with a given colour scheme and/or illumination scheme (e.g., a flashing pattern), for instance, as specified by configuration parameters. Additional or other representative visual event notifications 260 could correspond to a percentage of a virtual world or environment that is under the control of the user's forces 150; a critical or near-critical energy or resource level associated with particular user forces 150; a user-selectable narrative or storyline; or newly-arrived messages.

The display-enabled user input apparatus 200 can also be configured for presenting remotely monitored content 262 at one or more times (e.g., on a continuous, periodic, single time-interval, or as-user-requested basis), which in a representative embodiment includes visual information corresponding to a sensing or surveillance probe, camera, or device that is deployed to capture images within a visual or virtual region that is outside of a visual or virtual region defined by current primary visual interface content 110 and/or the navigation aid or map 256.

In a manner analogous to that indicated above, the primary display apparatus 100 and the display-enabled user input apparatus 200 can be configured to selectively present or display particular adjunct visual interface content 210 in various manners. For instance, in a representative embodiment illustrated in FIG. 1E, the display-enabled user input apparatus 200 is configured for presenting graphical hotkeys 250a-i, the navigation aid or map 256, object or character information 258, visual event notifications 260, and remotely monitored content 262. The primary display apparatus 100 is configured for presenting primary visual interface content 110 as well as the navigation aid or map 252 (e.g., on a selective or programmable basis), but the primary display apparatus 100 is configured to exclude, omit, or avoid presenting graphical hotkeys 250a-i, object or character information 258, and other adjunct visual interface content 210 such as visual event notifications 260 and remotely monitored content 260.

Thus, certain adjunct visual interface content 210 can be simultaneously presented by the primary display apparatus 100 and the display-enabled user input apparatus 200, while other adjunct visual interface content 210 can be exclusively presented by the display-enabled user input apparatus 200 instead of the primary display apparatus 100. That is, various embodiments of the present disclosure facilitate or enable (a) duplicate, counterpart, or analogous presentation or display of particular adjunct visual interface content 210 by each of a primary display apparatus 100 and at least one display-enabled user input apparatus 200; and/or (b) exclusive presentation or display of particular adjunct visual interface content 210 by at least one display-enabled user input apparatus 200 rather than a primary display apparatus 100 at one or more times. Particular adjunct visual interface content 210 presented by a display-enabled user input apparatus 200 can be identical to, duplicative of, derived from, or based upon adjunct visual interface content 210 that is presentable by the primary display apparatus 100. Additionally or alternatively, particular adjunct visual interface content 210 presented by a display-enabled user input apparatus 200 can be distinct from or not directly derived or derivable from adjunct visual interface content 210 that is presentable by the primary display apparatus 100. The display of adjunct visual interface content 210 by each of a primary display apparatus 100 and at least one display-enabled user input apparatus 200, and/or the exclusive display of adjunct visual interface content 210 by a display-enabled user input apparatus 200 rather than a primary display apparatus 100 can occur in a predetermined, selectable, programmable, or configurable manner.

As indicated above, adjunct visual interface content 210 can be adaptively generated, retrieved, changed, updated, presented, or removed at any given time based upon application program execution context, status, or state; current primary visual interface content 110; a situation, condition, or event corresponding to a visual or virtual region within or outside the bounds of current primary visual interface content 110; and/or user input. As further described in detail hereafter, in several embodiments, particular adjunct visual interface content 210 can be presented, adapted, or withdrawn (a) in response to user input directed to the primary visual interface, an adjunct visual interface, and/or a local or remote application program; or (b) automatically by an application program during ongoing or progressive application program execution as a result of the occurrence of certain types of application scenarios, situations, conditions, or events (i.e., an application program itself can drive or induce adaptive changes to adjunct visual interface content 210, for instance, in the absence of direct or local user input).

In response to user selection of a given visual or virtual environment location and/or an object or character 150 corresponding to primary visual interface content 110 shown in FIG. 1E, particular adjunct visual interface content 210 presented by the primary display apparatus 100 and/or a display-enabled user input apparatus 200 can adaptively change. Alternatively, as a result of an application scenario, situation, condition, or event such as an attack on user forces or resources, particular adjunct visual interface content 210 presented by one or both of the primary display apparatus 100 and a display-enabled user input apparatus 200 can by automatically adaptively changed.

Figure 1F:
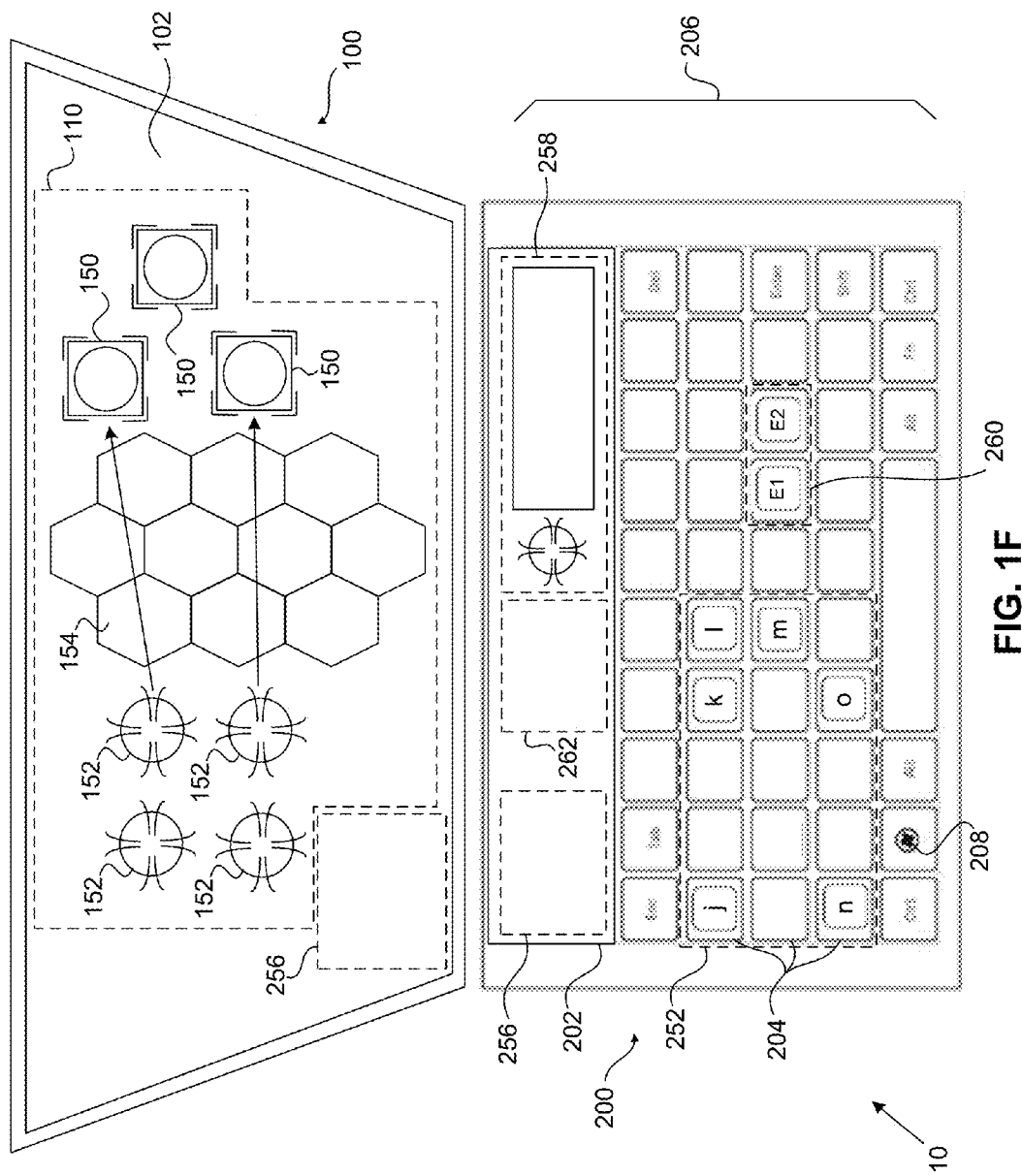
FIG. 1F is a schematic illustration of a representative system corresponding to FIG. 1E, in which adjunct visual interface content has been adapted, updated, or changed in response to user input or which has been automatically updated according to an embodiment of the disclosure.

FIG. 1F is a schematic illustration of a representative system 10 corresponding to FIG. 1E, in which certain adjunct visual interface content 210 has been adapted, updated, or changed (a) in response to user input; or (b) automatically by an application program during the course of application program execution according to an embodiment of the disclosure. More specifically, in response to user input such as user selection of a virtual location or object or character 150 within current primary visual interface content 110, and/or user selection of a particular graphical hotkey 250a-i shown in FIG. 1E, the array of graphical hotkeys 250a-i shown in FIG. 1E can been adaptively changed, such that the display-enabled input apparatus 200 presents an updated array of graphical hotkeys 252j-o. The updated array of graphical hotkeys 252j-o can invoke an updated set of game-related actions, functions, or operations by way of user selection in a manner that can be at least partially distinct from the game-related actions, functions, or operations associated with a previously considered array of graphical hotkeys 250a-i shown in FIG. 1E.

Alternatively, as a result of or in response to an attack on user forces or resources (where such an attack need not directly correspond to current primary visual interface content 110 or a current map 256), a game application program can automatically adaptively update primary visual interface content 110 as needed to visually indicate, correspond to, represent the attack under consideration, and/or automatically adaptively update adjunct visual interface content 210 to indicate or provide adjunct visual interface content 210 that is relevant to the attack under consideration. Such automatically adapted adjunct visual interface content 210 can include visual indications or representations of game functions, operations, actions, or information relevant to and/or available for user selection in the context of the attack on user forces or resources. For instance, with respect to FIG. 1F, automatically adaptively updated adjunct visual interface content 210 can include an updated array of graphical hotkeys 252j-o that can invoke game-related actions, functions, or operations that are relevant to an attack scenario or situation under consideration in response user selection.

While FIG. 1F illustrates the presentation of an updated array of graphical hotkeys 252*j-o* in a manner that is adaptive with respect to user input or application program execution, additional or other adjunct visual interface content 210 presented by a display-enabled user input apparatus 200 and/or the primary display apparatus 100 can be adaptively generated, retrieved, presented, output, changed, or withdrawn at one or more times based upon one or more of (a) local or remote application program execution context, status, or state; (b) current primary visual interface content 110; (c) a scenario situation, condition, or event corresponding to a visual or virtual region that is within or beyond the scope or bounds of primary visual interface content 110; and/or (d) user input. For instance, selected object or character information 258 can be adaptively updated or changed in response to user selection of different entities, forces, structures, devices, or resources 150, 152 or objects 154 corresponding to primary visual interface content 110. Additionally or alternatively, a virtual location on a navigation aid or map 256 corresponding to user activity within a region of a virtual world or environment can be automatically updated (e.g., progressively or periodically updated, or updated in response to the occurrence of an application scenario, situation, condition, or event), for instance, in a manner that corresponds to or is based upon current primary visual interface content 110.

In response to user selection of particular types of adjunct visual interface content 210, or following the occurrence of a given type of application program scenario, situation, condition, or event, one or both of primary visual interface content 110 and adjunct visual interface content 210 can be adaptively generated, retrieved, presented, output, changed, thematically modified, or withdrawn. For instance, in response to user selection of adjunct visual interface content 210 that corresponds to a visual or virtual region of immediate user interest beyond the scope or bounds of current primary visual interface content 110 or a current map 256 (e.g., an active visual event notification 260, or remotely monitored content 262), primary visual interface content 110 can be adaptively updated to display the visual or virtual region of immediate user interest rather than a visual or virtual region of lesser concern or interest to the user. Such an adaptive update of primary visual interface content 100 can also occur automatically (e.g., on an essentially immediate basis, or after a predetermined or selectable/programmable wait time has elapsed) in response to the occurrence of an application scenario, situation, condition, or event. That is, the focus or central subject matter or thematic context of displayed primary visual interface content 110 can be updated, shifted, or switched to directly reflect a visual or virtual region of immediate interest to the user in response to particular types of user input directed to the display-enabled user input apparatus 200, or as a result of a given application scenario, situation, condition, or event. Following an update of primary visual interface content 110, adjunct visual interface content 210 can be appropriately adaptively updated depending upon an application scenario, situation, condition, or event under consideration.

FIG. 1G is a schematic illustration of a representative system 10 corresponding to FIG. 1E, in which primary visual interface content 110 as well as certain adjunct visual interface content 210 has been adapted, updated, or changed in response to user input or the occurrence of an application scenario, situation, condition, or event according to an embodiment of the disclosure. More particularly, a particular visual event notification 260 such as shown in FIG. 1E can be presented, displayed, or activated in a manner that indicates the occurrence of a first event E1 corresponding to an attack on user forces or resources 150 deployed or positioned within a visual or virtual region or environment that is external to or remote from current primary visual interface content 110 or the map 256. For instance, a particular display-enabled key or button 204 can present an image, icon, and/or a set of visual signals in a manner that is expected to be readily noticeable or noticeable by the user, such as by way of changing optical intensity or flashing. In certain embodiments, the presentation, display, or activation of a given visual event notification 260 can be accompanied by audio signals.

As a result of the presentation, display, or activation of a visual event notification 260, an external or remote visual or virtual region or environment can become of immediate interest to the user. In response to user selection of the visual event notification 260 that indicates an attack is occurring or has occurred, primary visual interface content 110 is adaptively generated and/or updated to present or display the visual or virtual region or environment of immediate interest to the user, such that this visual or virtual region or environment of immediate interest can become the central focus of the user's attention or application program interaction experience. In certain embodiments, after a given wait time has elapsed following the activation of a given visual event notification 260, primary visual interface content 210 can be automatically adaptively generated or updated to present or display a visual or virtual region or environment of interest that should or is likely to be of immediate interest to the user.

With respect to a representative attack scenario, updated primary visual interface content 110 can include a number and/or configuration of enemy forces 153 that are engaged against particular user forces 150, 151. Corresponding adjunct visual interface content 210 such as one or more of the map 256, object or character information 258, and another set of graphical hotkeys 254*p-w* can be adaptively provided or updated (e.g., automatically or in response to additional user input) to reflect the visual region or environment of immediate user interest or attention, as well as currently available user selectable functions or options corresponding to this visual region or environment. Additionally, in some embodiments, a visual event notification 260 corresponding to a most-recent or previous visual region or environment under consideration can be provided, presented, or displayed. For instance, a visual event notification 260 that facilitates or enables restoration of former primary visual interface content 110 corresponding to a most-recent, prior, or "home" visual or virtual region or environment (indicated in FIG. 1G as "Ret") can be provided, thereby enabling the user to return to a prior visual or virtual region or environment once a situation corresponding to the first event E1 has been resolved.

In view of the description herein, various embodiments of the present disclosure provide a set of display-enabled user input apparatuses 200 that adaptively present adjunct visual interface content 210 in a manner that is efficiently, naturally, or essentially seamlessly integrated with the presentation of primary and/or adjunct visual interface content 110, 210 by a primary display apparatus 100, and which efficiently, naturally, or essentially seamlessly integrates with and/or expands the types of user selectable functions or operations provided by a set of local and/or remote application programs. Various embodiments of the present disclosure provide user selectable adjunct visual interface content 210 that facilitates, enables, or provides (a) an enhanced visual experience to the user; (b) more efficient and/or more accurate user interaction with the application program(s);

and (c) particular types of application program functionality not readily or normally available to a user of a conventional computing or gaming system.

In addition to or association with the foregoing, in several embodiments adjunct visual interface content 210 includes user selectable visual information that facilitates or enables (a) user monitoring or tracking of conditions, situations, or events of interest beyond existing or current primary visual interface content 110; and/or (b) adaptive visual context switching from existing or current primary and/or adjunct visual interface content 210, 210 to updated or new primary and/or adjunct visual interface content 210, 210 in a rapid, efficient, and/or accurate manner in response to user input directed to portions of a display-enabled user input apparatus 200. Moreover, the presentation of particular adjunct visual interface content 210 by portions of a display-enabled user interface apparatus rather than the presentation of such adjunct visual interface content 210 by a primary display apparatus 100 can increase an extent to which the main viewing region, area, or window 102 of the primary display apparatus 100 can be utilized for or dedicated to presenting primary visual interface content 110, thereby reducing visual interface clutter and aiding efficient user interaction with an application program.

Additional Aspects of Representative System Embodiments

Figure 1H:
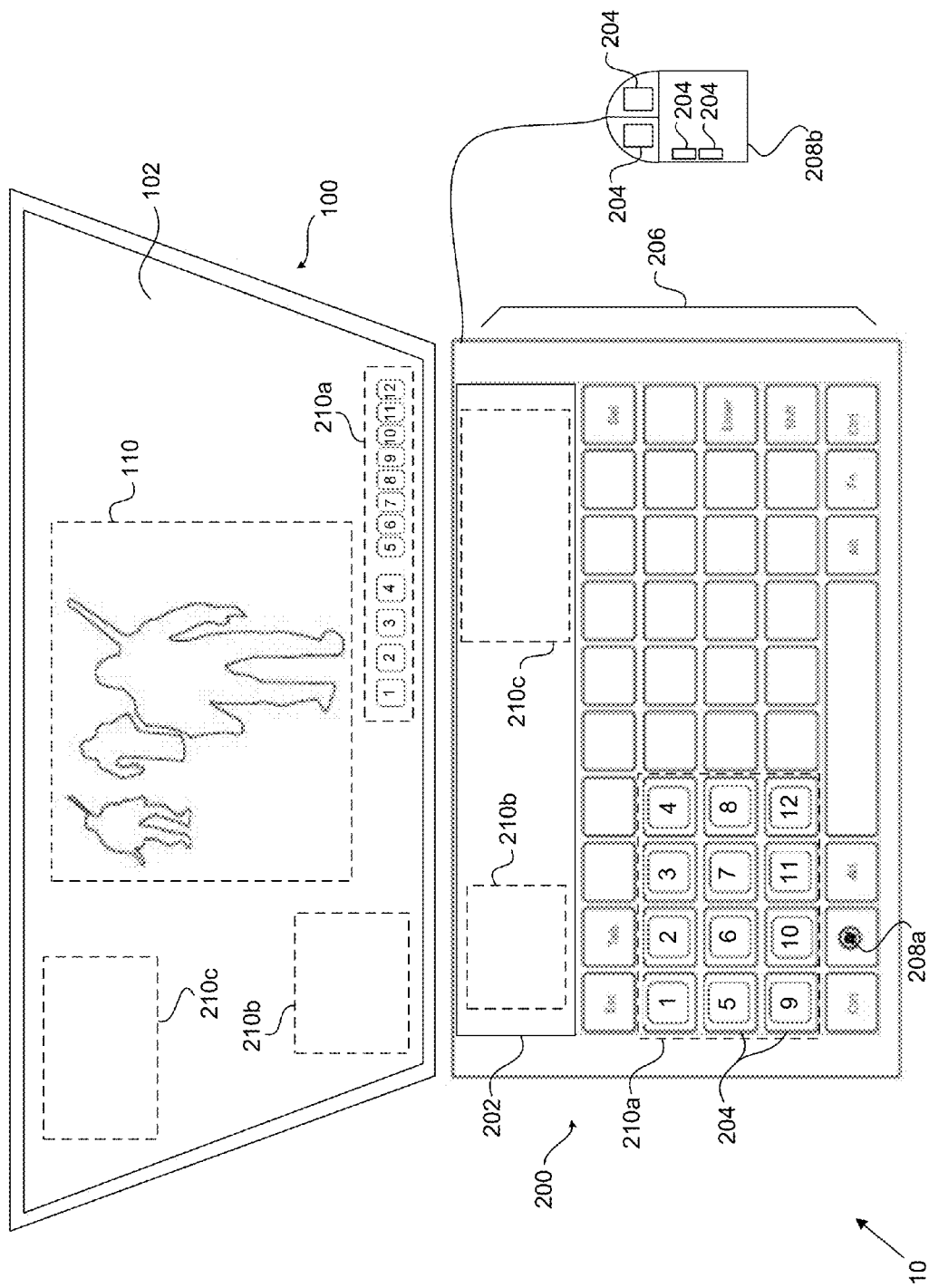
FIG. 1H is a schematic illustration of a representative system for managing, controlling, selecting, presenting, and/ or updating primary visual interface content and adjunct visual interface content using a primary display apparatus and at least one display-enabled user input apparatus according to another embodiment of the disclosure.

FIG. 1H is a schematic illustration of a representative system for managing, controlling, selecting, presenting, and/or updating primary visual interface content 110 and adjunct visual interface content 210 using a primary display apparatus 100 and at least one display-enabled user input apparatus 200 according to another embodiment of the disclosure. FIGS. 1A through 1G illustrate systems 10 in which a display-enabled user input apparatus 200 includes a display-enabled keyboard 206. In FIG. 1H, a set of display-enabled user input apparatuses 200 includes a display-enabled pointing device 208*b* that is separate or distinct from a display-enabled keyboard 206. In some embodiments, a display-enabled pointing device 208*b* can include a wireless or wire-based computer mouse or a game controller having one or more display-enabled buttons 204 (e.g., top and/or side buttons). Visual information or images presented by such display-enabled buttons 204 can be adaptively selected, presented, or updated in a manner that is identical, essentially identical, or analogous that described above. Additionally, a visual content configuration interface 300, 350 can facilitate or enable selective or programmable mapping, assignment, or allocation of particular adjunct visual interface content 210 to such display-enabled buttons 204, in a manner identical, essentially identical, or analogous to that previously described.

Figure 2A:
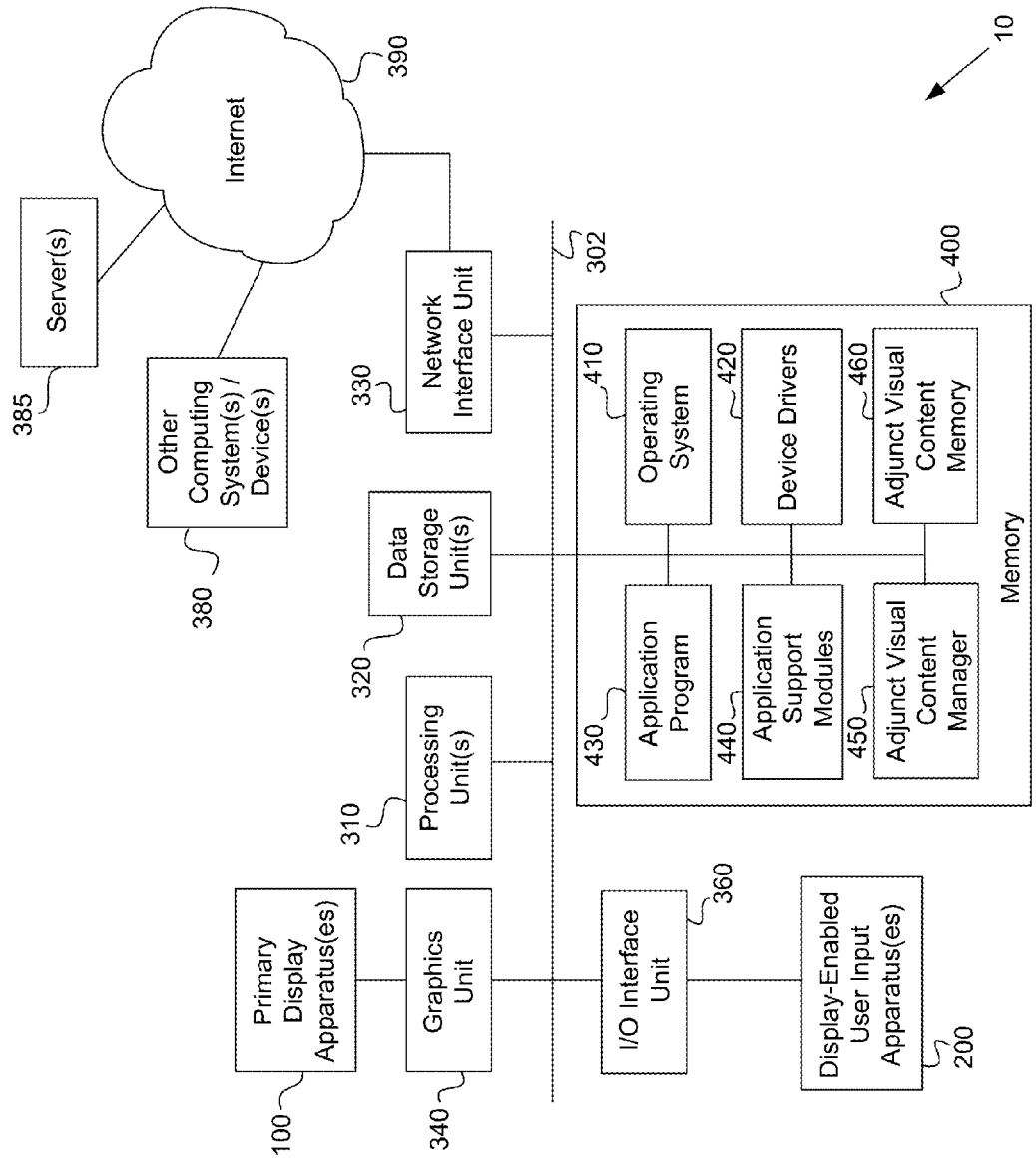
FIG. 2A is a block diagram of a representative system for generating, managing, controlling, selecting, presenting, and/or updating primary visual interface content and adjunct visual interface content using a primary display apparatus and at least one display-enabled user input apparatus according to an embodiment of the disclosure.

FIG. 2A is a block diagram of a representative system 10 for generating, managing, controlling, selecting, presenting, and/or updating primary visual interface content 110 and adjunct visual interface content 210 using a primary display apparatus 100 and at least one display-enabled user input apparatus 200 according to an embodiment of the disclosure. In an embodiment, the system 10 includes a processing unit 310; a memory 400; at least one data storage unit 320; a network interface unit 330 coupled to a computer network such as a Local Area Network (LAN), a Wide Area Network (WAN), and/or the Internet 390; a graphics unit 340 coupled to at least one primary display apparatus 100; and an input/output (I/O) unit 340 coupled to at least one display-enabled user input apparatus 200, and possibly coupled to one or more other types of input and/or output devices. The system 10 can additionally include one or more buses 302 (e.g., a PCI based bus) to which each system element is coupled to facilitate the communication or exchange of control signals, data, and information.

The processing unit 310 includes one or more instruction processing devices (e.g., at least one microprocessor and/or microcontroller) capable of executing stored program instructions. The memory 400 includes one or more types of volatile and/or nonvolatile memory, such as a register set, one or more buffers, Random Access Memory (RAM), and Read Only Memory (ROM) configured to store program instructions and data. The data storage unit 320 includes one or more types of fixed and/or removable data storage devices or elements, as well as storage media corresponding thereto. For instance, the data storage unit 320 can include a hard disk drive, a DVD or CD-ROM drive, and/or a USB flash drive. Portions of the data storage unit 320 and/or the memory 400 can form one or more computer programmable or readable media on which program instruction sets that facilitate or enable adjunct visual interface content presentation and/or management operations in accordance with an embodiment of the disclosure reside.

The network interface unit 330 can include a network communication interface such as an Ethernet interface configured to operate in accordance with a standard network information transfer protocol. In several embodiments, the graphics unit 340 can include a graphics processor configured to render images or scenes (e.g., computer or electronic game scenes) upon the primary display apparatus 100. The I/O interface unit 360 can include a set of standard interfaces or ports such as a USB port, a serial port, and/or other type of I/O communication interface that facilitates signal transfer with one or more display-enabled user input apparatuses 200 and other input and/or output devices coupled to the system 10.

Depending upon embodiment details, the system 10 can be a client system that communicates with one or more servers 30 or a server farm in accordance with a client-server computing architecture and a corresponding client-server communication protocol. Alternatively, the system 10 can be a peer system that communicates with other computer systems or computing or electronic devices in accordance with a peer-to-peer computing protocol. As yet another alternative, the system 100 can be an isolated or stand-alone system.

In several embodiments, the memory 400 includes an operating system 410; a set of device drivers 420; at least one application program 430 (e.g., a game application program, which can be a stand-alone, isolated, or non-networked program, or a networked program such as a game client); one or more application support modules 440; an adjunct visual content manager 450 that includes a set or program instructions configured to perform particular adjunct visual content management or presentation operations in accordance with an embodiment of the present disclosure; and an adjunct visual content memory 460 configured to store adjunct visual interface content 210 that can be transferred to a set of display-enabled input apparatuses 200. The application support modules 440 can include a set of plug-ins or add-ons that support particular types of application related functions (e.g., text or visual messaging operations, or the calculation of user APM values), and in certain embodiments the adjunct visual content manager 450 can itself include a plug-in or an add-on.

Figure 2B:
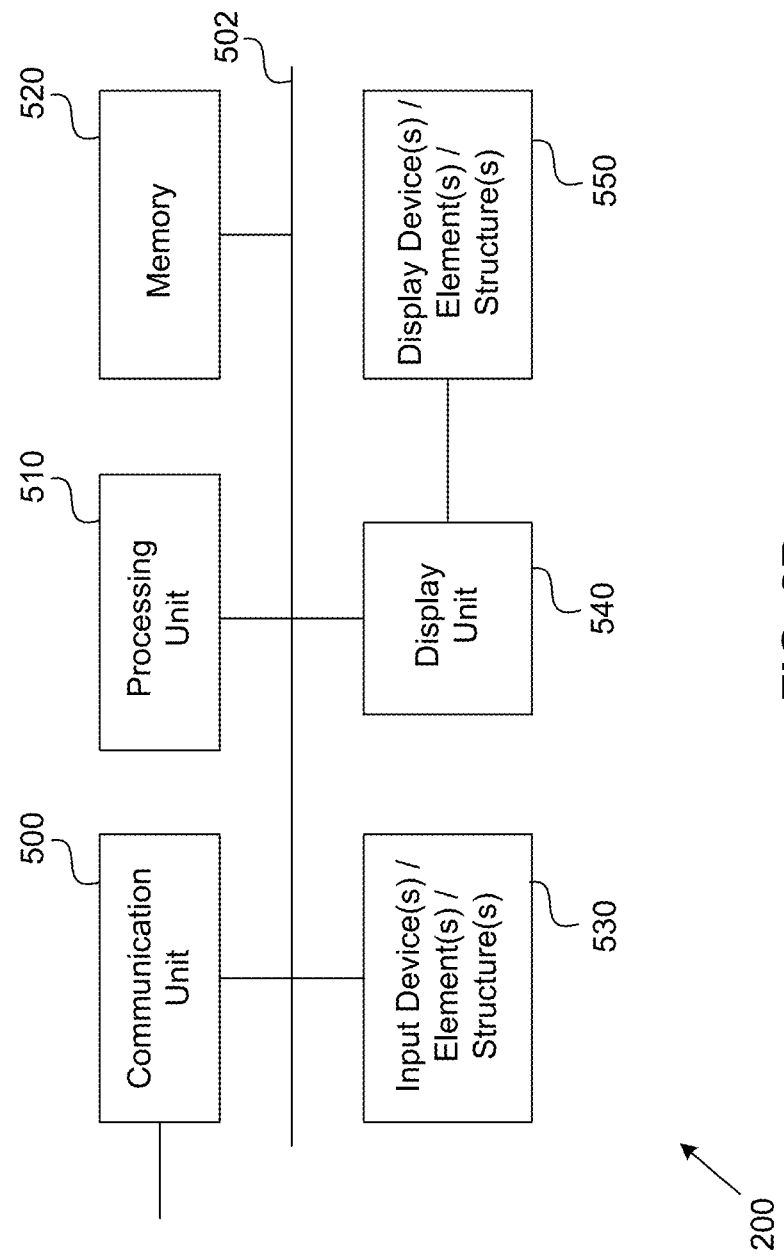
FIG. 2B is a block diagram of a representative display-enabled user input apparatus according to an embodiment of the disclosure.

FIG. 2B is a block diagram of a representative display-enabled user input apparatus 200 according to an embodiment of the disclosure. In an embodiment, the display-enabled user input apparatus 200 includes a communication unit 500; a processing unit 510; a memory 520; a set of input devices, elements, and/or structures 530; a set of display devices, elements, and/or structures 540; and a display unit 550. Particular elements of the display-enabled user input apparatus 200 can be coupled to a common bus 502.

The communication unit 500 can include data and/or signal communication circuitry that is configured to receive information such as adjunct visual interface content 210, one or more display device, element, or structure addresses and/or identifiers (IDs), and possibly configuration parameters and/or commands from other system elements, such as portions of the system 10 shown in FIG. 2A. The communication unit 500 can additionally be configured to communicate information to other system elements, where such information can include one or more input device, element, or structure IDs and possibly adjunct visual interface content 210 selected thereby in response to user input. The processing unit 510 can be an instruction processor such as a microcontroller, microprocessor, Application Specific Integrated Circuit (ASIC), or other type of device configured to execute stored program instructions and/or perform state machine operations. The memory 520 can include one or more types of RAM and/or ROM configured to store program instructions, adjunct visual interface content 210, configuration parameters, and/or commands. In embodiments in which the processing unit 510 includes an embedded microcontroller, the memory 520 can include on-chip and/or off-chip embedded memory. The set of input devices, elements, or structures 530 and the set of display devices, elements, or structures 540 can include one or more types of elements described above. The display unit 550 can include circuitry and/or program instructions (e.g., firmware) configured to drive the set of display devices, elements, and/or structures 540 and output adjunct visual interface content 210 thereto.

Aspects of Representative Visual Content Configuration Interfaces

Figure 3A:
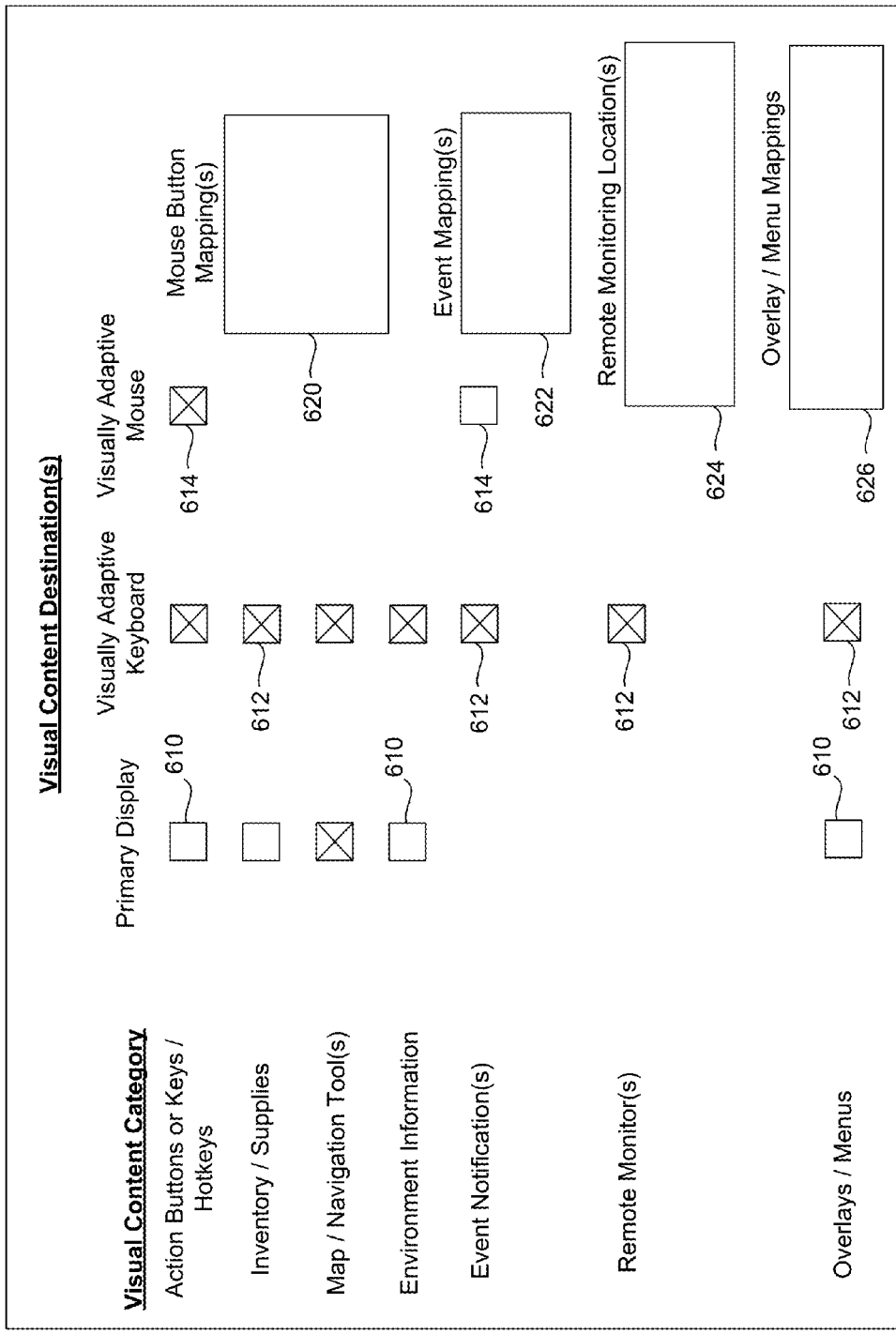
FIG. 3A is a schematic illustration of a representative visual content configuration interface according to an embodiment of the disclosure.

FIG. 3A is a schematic illustration of a representative visual content configuration interface 600 according to an embodiment of the disclosure, by which a user can selectively or programmably specify or designate a set of presentation or display destinations for one or more types of adjunct visual interface content 210. A visual content configuration interface 600 can include a graphical window 602 that displays textual labels or identifiers corresponding to particular presentation or display apparatus destinations, such as "primary display," "visually adaptive keyboard," and/or "visually adaptive mouse" respectively corresponding to a primary display apparatus 100, a display-enabled keyboard 206, and a display-enabled mouse 208b. The visual content configuration interface 600 can also include textual labels or identifiers corresponding to particular types or categories of adjunct visual interface content 210, such as one or more of "action buttons or keys/hotkeys," "inventory/supplies," "map/navigation tools," "environment information," "event notification(s)," "remote monitor(s)," and "overlays/menus."

The visual content configuration interface 600 can further include a set of graphical user interface (GUI) elements that facilitate or enable assignment or mapping of particular types of adjunct visual interface content 210 to particular display apparatus destinations in response to user input or selection. For instance, the visual content configuration interface 600 can include GUI elements such as a number of check boxes 610 corresponding to the primary display apparatus 100; a number of check boxes 612 corresponding to a display-enabled keyboard 206; and/or a number of check boxes 614 corresponding to a display-enabled mouse 208b. Any given check box 610, 612, 614 corresponds to a particular type of adjunct visual interface content 210 as well as a display destination for such adjunct visual interface content 210. Thus, user selection of a given check box 610, 612, 614 results in the establishment of an association or mapping between a particular type of adjunct visual interface content 210 and the primary display apparatus 100 and/or one or more display-enabled user input apparatuses 200.

In some embodiments, a visual content configuration interface 600 can also include or invoke one or more associated graphical interfaces 620, 622, 624, 626 configured to receive user input that indicates, selects, specifies, or defines (a) mappings between particular types of adjunct visual interface content 210 and particular display-enabled mouse buttons 204; (b) particular types of application events for which visual event notifications 260 are to be provided; (c) a set of visual or virtual environment or world locations or positions from which remotely monitored content 262 is to be obtained or generated; and/or (d) mappings between particular types of visual overlays or menus 218a,b and the primary display apparatus 100 and/or one or more display-enabled user input apparatuses 200.

FIG. 3B is a schematic illustration of a representative visual or graphical content configuration interface 650 according to a further or another embodiment of the disclosure, which can be invoked either alone or in association with another visual content configuration interface 600 such as that illustrated in FIG. 3A. In an embodiment, a visual or graphical content configuration interface 650 can include a graphical window 660 having a first visual region 670 in which different categories of adjunct visual interface content 210 can be visually indicated, depicted, or outlined; and a second visual region 680 in which portions of one or more display-enabled user input apparatuses 200 are visually indicated, depicted, or outlined. Such a visual content configuration interface 650 thus provides an pictorial or graphical representation of particular types of adjunct visual interface content 210, as well as a pictorial or graphical representation of one or more actual display-enabled user input apparatuses 200 as well as corresponding display-enabled user input apparatus positions, locations, devices, elements, and/or structures relative to, at, or upon which adjunct visual interface content 200 can be placed, moved, assigned, or mapped.

In a representative embodiment, the first visual region 670 can include visual representations of one or more graphical hotkey arrays 250, 252, 254; visual message content 216; a set of visual overlays or menus 218a-c; a set of maps or navigational aids 256; object or character information 258; one or more visual event notifications 260; remotely monitored content 262; and/or other information. Visual representations of such adjunct visual interface content 210 can be transferred or moved to or placed upon particular portions of the pictorial representation(s) of the display-enabled user input apparatus(es) 200 depicted in the second visual region 680 (e.g., corresponding to a touch screen display 202 and/or a set of display-enabled keys or buttons 204 of a display-enabled keyboard 206) in response to user input, for instance, by way of a set of drag and drop operations. As a result, one or more types of adjunct visual interface content 210 can be associated with or assigned or mapped to particular portions of a display-enabled user input apparatus 200 in a user specified, user selective, or variable manner in response to graphical user input. Representative drag and drop operations and corresponding adjunct visual interface content mappings to particular display-enabled user input apparatus positions, devices, elements, and/or structures are indicated in FIG. 3B by lines with terminal arrows.

In certain embodiments, particular adjunct visual interface content 210 can be additionally or alternatively selected and/or positioned upon a pictorial or graphical representation of a display-enabled user input apparatus 200, and corresponding associations or mappings between such adjunct visual interface content 210 and portions of the display-enabled user input apparatus established or generated, by way of user input directed to arrow keys; a joystick, pointing stick, or pointing nub; a trackball; a touchpad or trackpad; and/or another type of user input device or element. Such user input devices or elements can be carried by an actual display-enabled user input apparatus 200.

In some embodiments, during application program execution, the position(s) or location(s) of particular adjunct visual interface content 210 currently displayed by an actual display-enabled user input apparatus 200 can be modified, adjusted, or updated in response to user input directed to one or more types of user input devices or elements indicated above. Additionally or alternatively, the position(s) or location(s) of adjunct visual interface content 210 under consideration can be modified, adjusted, or updated by further user interaction with a configuration interface 600,650 while application program execution is interrupted or occurring in a background task execution mode.

The type(s) of adjunct visual interface content 210 available for user selection within a visual content configuration interface 600, 650 can depend upon an application program under consideration, and/or a range of supported application program functions or operations. Furthermore, the type(s) of display-enabled user input apparatuses 200 to which adjunct visual interface content 210 can be assigned or mapped within a visual content configuration interface 600, 650 can depend upon embodiment details and/or system hardware or software capabilities. In multiple embodiments, a default set of configuration parameters corresponding to an application program under consideration can be provided or retrieved (e.g., from a memory 400, 520 or a data storage unit 320, where the default set of configuration parameters provides or establishes a set of default, predefined, or predetermined associations or mappings between particular types of adjunct visual interface content 210 and portions of one or more display-enabled user input apparatuses 200 and possibly portions of the primary display apparatus 100.

Further Aspects of Adjunct Visual Interface Content Management or Presentation

In some embodiments, the presentation of particular adjunct visual interface content 210 by the primary display apparatus 100 is accompanied by the simultaneous primary display apparatus presentation of one or more user selectable graphical controls corresponding to, proximate to, or within such adjunct visual interface content 100. For instance, such user selectable graphical controls can include a set of GUI controls within a child window or subwindow that displays particular adjunct visual interface content 210, as further described hereafter.

Figure 4A:
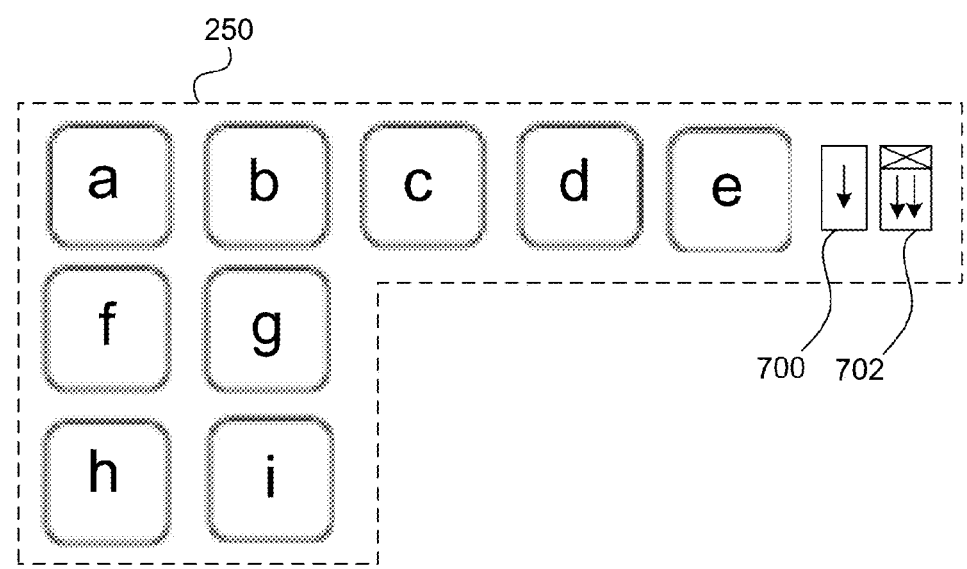
FIG. 4A is a schematic illustration of a first and a second graphical visual content transfer control corresponding to particular adjunct visual interface content displayed by a primary display apparatus according to an embodiment of the disclosure.

FIG. 4A is a schematic illustration of a first and a second graphical visual content transfer control 700, 702 corresponding to particular adjunct visual interface content 210 displayed by the primary display apparatus 100 according to an embodiment of the disclosure. In a representative embodiment, in response to user selection of a first graphical visual content transfer control 700, adjunct visual interface content 210 that is currently displayed by the primary display apparatus 100 and which is currently absent from or not displayed by a display-enabled user input apparatus 200 (e.g., a display-enabled keyboard 206) is displayed by or duplicated upon a portion of the display-enabled user input apparatus 200, and remains displayed by the primary display apparatus 100. Additionally or alternatively, in response to user selection of a second graphical visual content transfer control 702, adjunct visual interface content 210 that is currently displayed by the primary display apparatus 100 and which is currently absent from a display-enabled user input apparatus 200 is transferred to a portion of the display-enabled user input apparatus 200, and such adjunct visual interface content 210 is subsequently removed from or no longer displayed by the primary display apparatus 100 (e.g., the continued display of such adjunct visual interface content 210 by the primary display apparatus 100 is interrupted, terminated, or avoided).

Particular embodiments according to the present disclosure can provide one or more manners of restoring adjunct visual content 210 that has been removed from the primary display apparatus 100 back to the primary display apparatus 100; interrupting, terminating, or avoiding the continued display of adjunct visual content 210 that has been transferred from the primary display apparatus 100 to a display-enabled user input apparatus 200; and/or transferring adjunct visual content 210 not previously or currently displayed by the primary display apparatus 100 to the primary display apparatus 100.

Figure 4B:
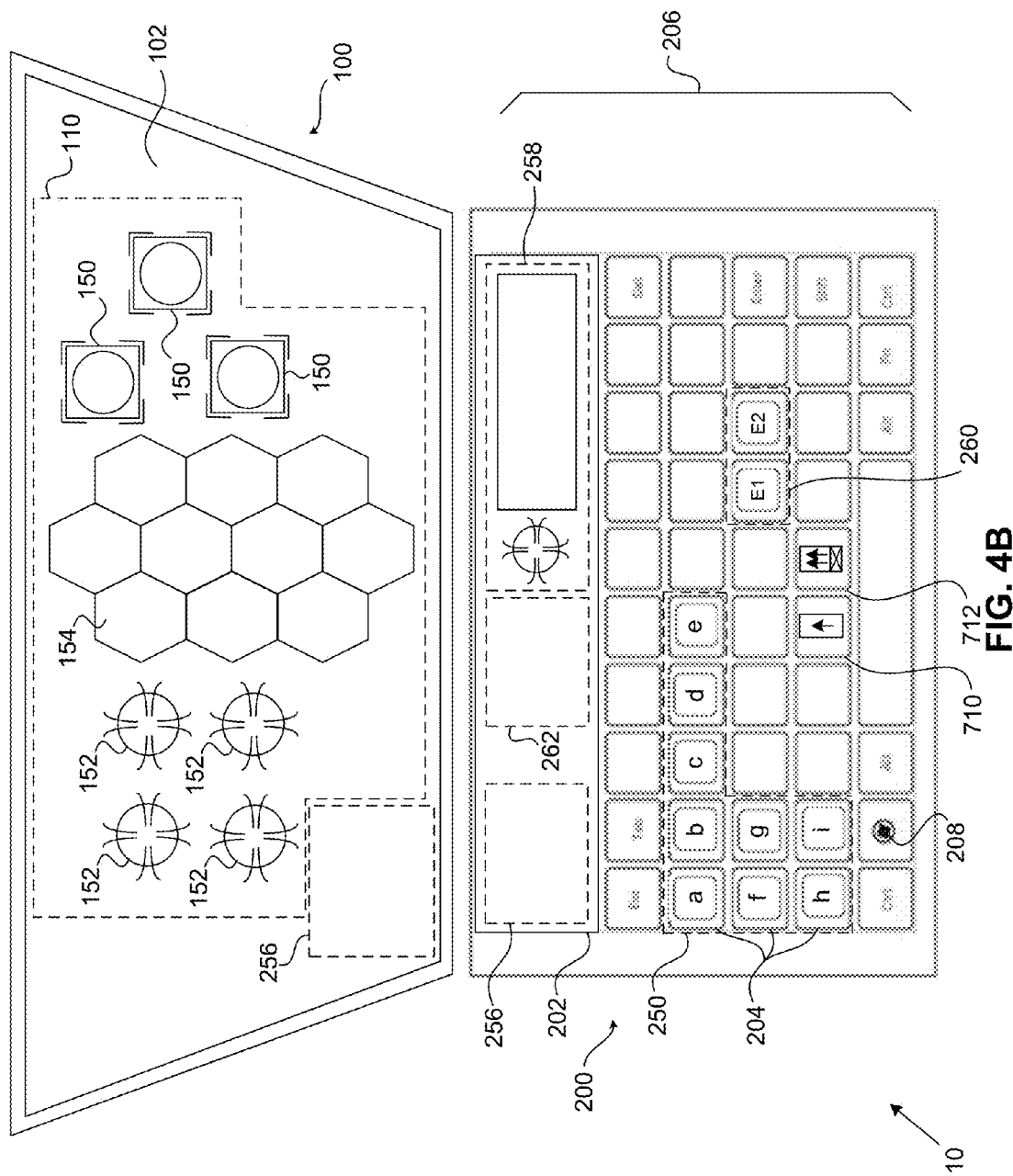
FIG. 4B is a schematic illustration of a first visual content transfer key or button and a second visual content transfer key or button carried by a display-enabled user input apparatus according to an embodiment of the disclosure.

FIG. 4B is a schematic illustration of a first visual content transfer key or button 710 and a second visual content transfer key or button 712 carried by a display-enabled user input apparatus 200 according to an embodiment of the disclosure. In an embodiment, the first visual content transfer key or button 710 can display a first image, icon, or symbol corresponding to the transfer of adjunct visual interface content 210 from the display-enabled user input apparatus 200 to the primary display apparatus 100 (e.g., the restoration of adjunct visual interface content 210 back to the primary display apparatus 110, or an initial or first-time transfer of adjunct visual interface content 210 to the primary display apparatus 110) and the continued display of such adjunct visual interface content 210 by the display-enabled user input apparatus 200. The second visual content transfer key or button 712 can display a second image, icon, or symbol corresponding to the transfer of adjunct visual interface content 210 from the display-enabled user input apparatus 200 to the primary display apparatus 100 and the cessation, interruption, or avoidance of the continued display of such adjunct visual interface content 210 by the display-enabled user input apparatus 200.

In specific embodiments, particular adjunct visual interface content 210 currently displayed by the display-enabled user input apparatus 200 can be selected for transfer to the primary display apparatus 100 by user selection of the first or second display-enabled key or button 710, 712 in combination or simultaneous with user selection of particular adjunct visual interface content 210 to be transferred (e.g., by way of user selection of a display-enabled key or button 204 or a portion of a touch screen display 202). Particular adjunct visual interface content 210 displayed by a display-enabled user input apparatus 200 during a first time interval can thus be displayed by the primary display apparatus 100 during a second time interval, either simultaneous with or exclusive of the display of such adjunct visual interface content 210 by the display-enabled user input apparatus 210 during the second time interval.

Figure 5:
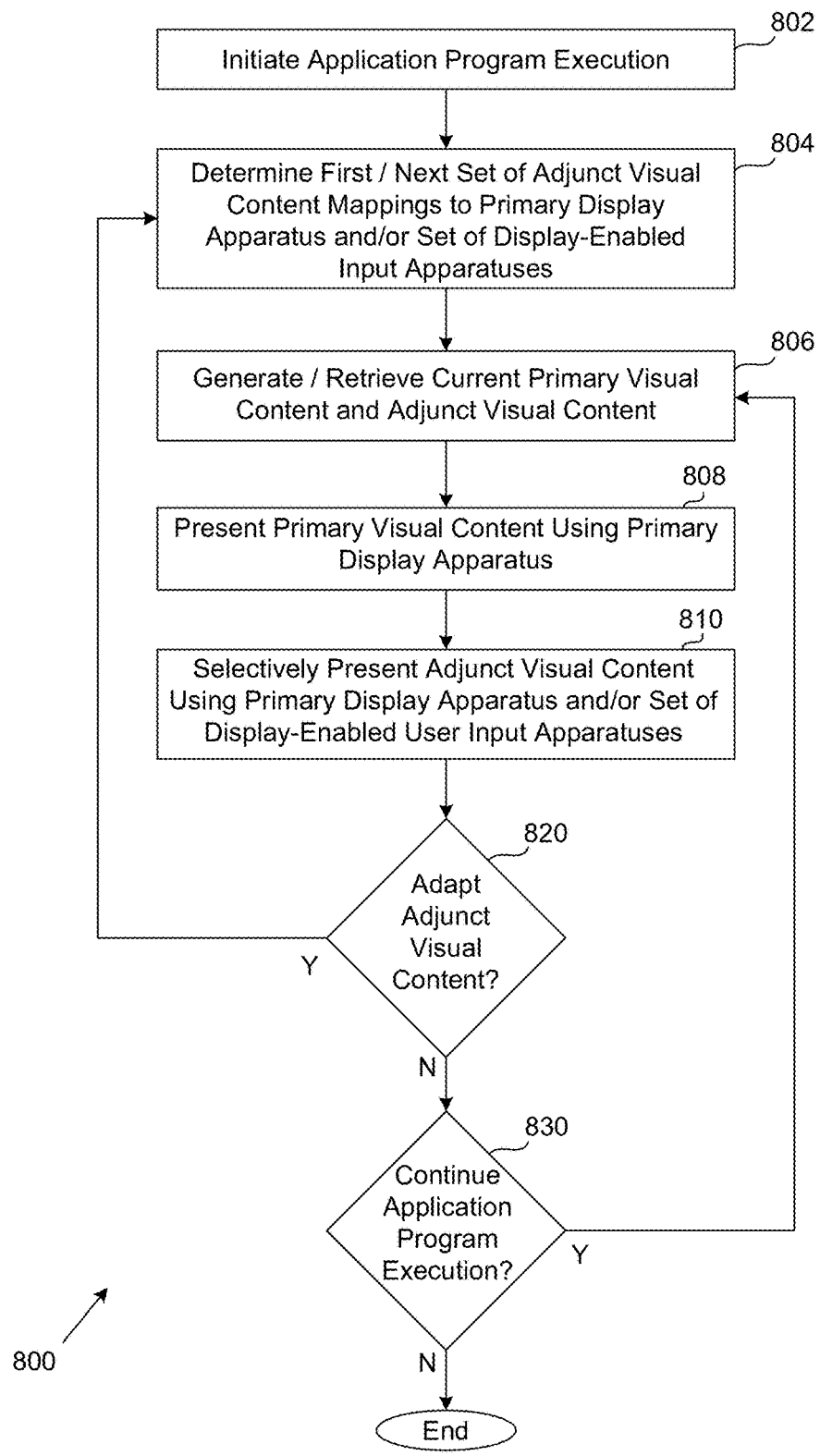
FIG. 5 is a flow diagram of a process for generating, managing, controlling, selecting, presenting, and/or updating primary visual interface content and adjunct visual interface content using a primary display apparatus and at least one display-enabled user input apparatus according to an embodiment of the disclosure.

Aspects of Adjunct Visual Interface Content Management or Presentation Processes FIG. 5 is a flow diagram of a process 800 for generating, managing, controlling, selecting, presenting, and/or updating primary visual interface content 110 and adjunct visual interface content 210 using a primary display apparatus 100 and at least one display-enabled user input apparatus 200 according to an embodiment of the disclosure. In an embodiment, the process 800 includes a first process portion 802 involving initiating the execution of an application program currently under consideration, and a second process portion 804 involving determining a first or next set of mappings between adjunct visual interface content 210 and the primary display apparatus 100 and one or more display-enabled user input apparatuses 200. The second process portion 804 can include identifying particular types of adjunct visual interface content 210 that are to be associated with or assigned to particular display-enabled user input elements 202, 204 based upon an a set of configuration parameters, mappings, or associations established by way of a configuration interface 500, 550 and/or an initial application program execution context, status, or state.

A third process portion 806 involves generating and/or retrieving primary visual interface content 110 and adjunct visual interface content 210. A fourth process portion 808 involves presenting primary visual interface content 110 by way of the primary display apparatus 100, and a fifth process portion 710 involves selectively presenting adjunct visual interface content 210 by way 810 the primary display apparatus 100 and one or more display-enabled user input apparatuses 200 in accordance with a current set of configuration parameters or mappings between adjunct visual interface content 210 and such display apparatuses 100, 200. In some embodiments, the fifth process portion 810 can involve presenting particular adjunct visual interface content 210 using each of the primary display apparatus 100 and a display-enabled user input apparatus 200, such that particular adjunct visual interface content 210 is duplicated by portions of the primary display apparatus 100 and a display-enabled user input apparatus 200. Additionally or alternatively, the fifth process portion 810 can involve presenting certain adjunct visual interface content 210 exclusively by portions of a display-enabled user input apparatus 200, where such adjunct visual interface content 210 would otherwise, normally, or conventionally be presented by portions of the primary display apparatus 100. Thus, the fifth process portion 810 can involve selectively excluding certain adjunct visual interface content 210 from the primary display apparatus 100 by presenting such adjunct visual interface content 210 using a display-enabled user input apparatus 200.

A sixth process portion 820 involves determining whether adjunct visual interface content 210 and possibly primary visual interface content 110 is to be adaptively updated, modified, or changed, for instance, in response to user input directed to a display-enabled user input apparatus 200, a change in primary visual interface content 110, and/or a transition in application program execution context, status, or state. If so, the process 800 can return to the second process portion 802. Otherwise, a seventh process portion 830 involves determining whether to continue application program execution. If so, the process 800 can return to the third process portion 806. If application program execution is to be discontinued, the process 800 ends.

A process 800 such as that shown in FIG. 5 can be repeated for multiple distinct application programs, including multiple related types of application programs (e.g., multiple electronic or computer game application programs) or multiple unrelated types of application programs (e.g., one or more electronic or computer or electronic game application programs, and one or more application programs not related to electronic or computer gaming). As a result, embodiments of the present disclosure can adaptively configure a single set of display-enabled user input apparatuses 200 (e.g., a single display-enabled input apparatus 200 such as a display-enabled keyboard 206, or a plurality of display-enabled input apparatuses 200 such as a display-enabled keyboard 206 and a display-enabled mouse 208b) in different or distinct manners in accordance with the primary visual interface content 110 and adjunct visual interface content 210 corresponding to any given application program under consideration.

During the execution of a particular application program within a plurality of application programs for which adjunct visual interface content 210 can be generated or retrieved and presented by a set of display-enabled user input devices 200, adjunct visual interface content 210 can be presented or displayed at one or more times in a manner that is specifically or uniquely tailored or adapted to the particular application program under consideration, and which is further dynamically adapted during the execution of this application program based upon execution context, status, or state; primary visual interface content 110; adjunct visual interface content 210; and/or user input. Embodiments of the present disclosure can therefore eliminate a need for prior types of application program specific input devices (e.g., game specific keyboards, which are non-adaptable or non-reconfigurable or minimally-reconfigurable with respect to different application programs) that attempt to enhance the number or types functions or information presented for user selection.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

The invention claimed is:

1. An automated method for presenting visual interface content comprising primary visual interface content and adjunct visual interface content during application program execution, the primary visual interface content providing a main source of visual information that indicates a current application program execution context, the adjunct visual interface content providing visual information associated with application program execution, the method comprising:
  displaying a first primary visual interface content using a primary display apparatus during application program execution;
  displaying a first adjunct visual interface content using a set of display-enabled user input apparatuses during application program execution, the first adjunct visual interface content including visual information that corresponds to a portion of a visual environment absent from the primary display apparatus and which is indicative of an application event within the execution context of the application program, an array of graphical hotkeys configured to invoke particular application-related functions in response to user selection, and notifications of events, the events being within a visual environment that is outside of a visual space corresponding to the first primary visual interface content, and the events being within the execution context of the application program;
adaptively displaying updated visual interface content by displaying at least one of updated primary visual interface content using the primary display apparatus and updated adjunct visual interface content using the set of display-enabled user input apparatuses, the updated primary visual interface content distinct from the first primary visual interface content and the updated adjunct visual interface content distinct from the first adjunct visual interface content,
wherein the updated adjunct visual interface content comprises an updated array of graphical hotkeys configured to invoke an updated set of application-related functions by way of user selection in a manner that can be at least partially distinct from the application-related functions associated with the array of graphical hotkeys of the first adjunct visual interface content;
selectively establishing mappings between portions of at least one display-enabled user input apparatus within the set of display-enabled user input apparatuses and at least a subset of at least one of the first adjunct visual interface content and the updated adjunct visual interface content in response to a first user input; and
receiving a second user input corresponding to an amount of adjunct visual interface content to be displayed by the set of display-enabled user input apparatuses, wherein the receiving of the second user input corresponding to the amount of adjunct visual interface content to be displayed by the set of display-enabled user input apparatuses comprises receiving the second user input that indicates an amount of adjunct visual interface content to be excluded from display by the primary display apparatus.

2. The method of claim 1, wherein displaying the updated adjunct visual interface content occurs (a) automatically as a result of an occurrence of at least one application event within a set of application events during application program execution; and (b) in response to user input directed to interacting with the application program during application program execution.

3. The method of claim 1, wherein the first user input at least one of selectively defines and selectively modifies a display location of at least a subset of at least one of the first adjunct visual interface content and the updated adjunct visual interface content upon at least one display-enabled user input apparatus within the set of display-enabled user input apparatuses.

4. The method of claim 1, wherein the first user input comprises a drag and drop operation directed to a graphical configuration interface that provides a graphical representation of at least one display-enabled user input apparatus within the set of display-enabled user input apparatuses.

5. The method of claim 1, further comprising increasing an extent to which a portion of the primary display apparatus is available to display the first primary visual interface content based upon the first user input.

6. The method of claim 5, further comprising increasing at least one of an amount of visual information and an amount of visual detail conveyed by the first primary visual interface content based upon the first user input.

7. The method of claim 1, further comprising displaying at least a subset of the first adjunct visual interface content using the primary display apparatus simultaneous with the display of the first adjunct visual interface content using the set of display-enabled user input apparatuses.

8. The method of claim 7, wherein the subset of the first adjunct visual interface content s selectively defined based upon user input.

9. The method of claim 1, wherein displaying the first adjunct visual interface content comprises exclusively displaying the first adjunct visual interface content using the set of display-enabled user input apparatuses rather than the primary display apparatus as a result of the second user input.

10. The method of claim 1, wherein displaying the first adjunct visual interface content and displaying the updated adjunct visual interface content comprises exclusively displaying the first adjunct visual interface content and the updated adjunct visual interface content using the set of display-enabled user input apparatuses rather than the primary display apparatus as a result of the second user input.

11. A set of non-transitory computer readable media storing program instructions that when executed cause an automated system having a processing unit, a memory, a primary display apparatus, and a set of display-enabled user input apparatuses to perform visual interface content management operations corresponding to visual interface content that comprises primary visual interface content and adjunct visual interface content, the primary visual interface content providing a main source of visual information that indicates a current application program execution context, the adjunct visual interface content providing visual information associated with application program execution the visual interface content management operations comprising:
displaying a first primary visual interface content using a primary display apparatus during application program execution;
displaying a first adjunct visual interface content using a set of display-enabled user input apparatuses during application program execution, the first adjunct visual interface content including visual information that corresponds to a portion of a visual environment absent from the primary display apparatus and which is indicative of an application event within the execution context of the application program, an array of graphical hotkeys configured to invoke particular application-related functions in response to user selection, and notifications of events, the events being within a visual environment that is outside of a visual space corresponding to the first primary visual interface content, and the events being within the execution context of the application program;
adaptively displaying updated visual interface content by displaying at least one of updated primary visual interface content using the primary display apparatus and updated adjunct visual interface content using the set of display-enabled user input apparatuses, the updated primary visual interface content distinct from the first primary visual interface content and the updated adjunct visual interface content distinct from the first adjunct visual interface content,
wherein the updated adjunct visual interface content comprises an updated array of graphical hotkeys configured to invoke an updated set of application-related functions by way of user selection in a manner that can be at least partially distinct from the application-related functions associated with the array of graphical hotkeys of the first adjunct visual interface content;
selectively establishing mappings between portions of at least one display-enabled user input apparatus within the set of display-enabled user input apparatuses and at least a subset of at least one of the first adjunct visual interface content and the updated adjunct visual interface content in response to a first user input; and receiving a second user input corresponding to an amount of adjunct visual interface content to be displayed by the set of display-enabled user input apparatuses, wherein the receiving of the second user input corresponding to the amount of adjunct visual interface content to be displayed by the set of display-enabled user input apparatuses comprises receiving the second user input that indicates an amount of adjunct visual interface content to be excluded from display by the primary display apparatus.

12. The set of non-transitory computer readable media of claim 11, wherein displaying the updated adjunct visual interface content comprises (a) automatically displaying the updated adjunct visual interface content as a result of an occurrence of at least one application event within a set of application events during application program execution; and (b) displaying the updated adjunct visual interface content in response to user input directed to interacting with the application program during application program execution.

13. The set of non-transitory computer readable media of claim 11, wherein the first user input at least one of selectively defines and selectively modifies a display location of at least a subset of at least one of the first adjunct visual interface content and the updated adjunct visual interface content upon at least one display-enabled user input apparatus within the set of display-enabled user input apparatuses.

14. The set of non-transitory computer readable media of claim 11, wherein the first user input comprises a drag and drop operation directed to a graphical configuration interface that provides a graphical representation of at least one display-enabled user input apparatus within the set of display-enabled user input apparatuses.

15. The set of non-transitory computer readable media of claim 11, further storing program instructions that when executed cause the system to perform visual interface content management operations further comprising increasing at least one of an amount of visual information and an amount of visual detail conveyed by the first primary visual interface content based upon the first user input.

16. The set of non-transitory computer readable media of claim 11, further storing program instructions that when executed cause the system to perform visual interface content management operations further comprising displaying at least a subset of at least one of the first adjunct visual interface content and the updated adjunct visual interface content using the set of display-enabled user input apparatuses rather than the primary display apparatus in response to the second user input.

17. The set of non-transitory computer readable media of claim 11, further storing program instructions that when executed cause the system to perform visual interface content management operations further comprising exclusively displaying at least one of the first adjunct visual interface content and the updated adjunct visual interface content using the set of display-enabled user input apparatuses rather than the primary display apparatus in response to the second user input.

18. A system for presenting visual interface content comprising primary visual interface content and adjunct visual interface content during application program execution, the primary visual interface content providing a main source of visual information that indicates a current application program execution context, the adjunct visual interface content providing visual information associated with application program execution, the system comprising:

a processing unit;

a primary display apparatus coupled to the processing unit;

a set of display-enabled user input apparatuses coupled to the processing unit;

a memory coupled to the processing unit, the memory comprising:

an application program; and a visual interface content manager comprising program instructions that when executed one of manage and perform visual interface content management operations comprising:

displaying a first primary visual interface content using a primary display apparatus during application program execution;

displaying a first adjunct visual interface content using the set of display-enabled user input apparatuses during application program execution, the first adjunct visual interface content including visual information that corresponds to a portion of a visual environment absent from the primary display apparatus and which is indicative of an application event within the execution context of the application program, an array of graphical hotkeys configured to invoke particular application-related functions in response to user selection, and notifications of events, the events being within a visual environment that is outside of a visual space corresponding to the first primary visual interface content, and the events being within the execution context of the application program;

adaptively displaying updated visual interface content by displaying at least one of updated primary visual interface content using the primary display apparatus and updated adjunct visual interface content using the set of display-enabled user input apparatuses, the updated primary visual interface content distinct from the first primary visual interface content and the updated adjunct visual interface content distinct from the first adjunct visual interface content, wherein the updated adjunct visual interface content comprises an updated array of graphical hotkeys configured to invoke an updated set of application-related functions by way of user selection in a manner that can be at least partially distinct from the application-related functions associated with the array of graphical hotkeys of the first adjunct visual interface content;

selectively establishing mappings between portions of at least one display-enabled user input apparatus within the set of display-enabled user input apparatuses and at least a subset of at least one of the first adjunct visual interface content and the updated adjunct visual interface content in response to a first user input; and receiving a second user input corresponding to an amount of adjunct visual interface content to be displayed by the set of display-enabled user input apparatuses, wherein the receiving of the second user input corresponding to the amount of adjunct visual interface content to be displayed by the set of display-enabled user input apparatuses comprises receiving the second user input that indicates an amount of adjunct visual interface content to be excluded from display by the primary display apparatus.

19. The system of claim 18, wherein displaying the updated adjunct visual interface content occurs (a) automatically as a result of an occurrence of at least one application event within a set of application events during application program execution; and (b) in response to user input directed to interacting with the application program during application program execution.

20. The system of claim 18, wherein the first user input at least one of selectively defines and selectively modifies a display location of at least a subset of at least one of the first adjunct visual interface content and the updated adjunct visual interface content upon at least one display-enabled user input apparatus within the set of display-enabled user input apparatuses.

21. The system of claim 20, wherein the visual interface content management operations further comprise providing a graphical content configuration interface that provides a graphical representation of at least one display-enabled user input apparatus within the set of display-enabled user input apparatuses and which is responsive to drag and drop operations corresponding to the graphical representation of the at least one display-enabled user input apparatus within the set of display-enabled user input apparatuses.

22. The system of claim 18, wherein the visual interface content management operations further comprise increasing at least one of an amount of visual information and an amount of visual detail conveyed by the first primary visual interface content based upon the first user input.

23. The system of claim 18, wherein the visual interface content management operations further comprise selectively excluding at least a subset of at least one of the first adjunct visual interface content and the updated adjunct visual interface content from display by the primary display apparatus in response to the second user input.

* * * * *